Feb. 11, 1958 J. A. ZINN, JR., ET AL 2,822,653
APPARATUS FOR CLOSING AND SEALING CONTAINERS
Filed Feb. 19, 1954 16 Sheets-Sheet 3
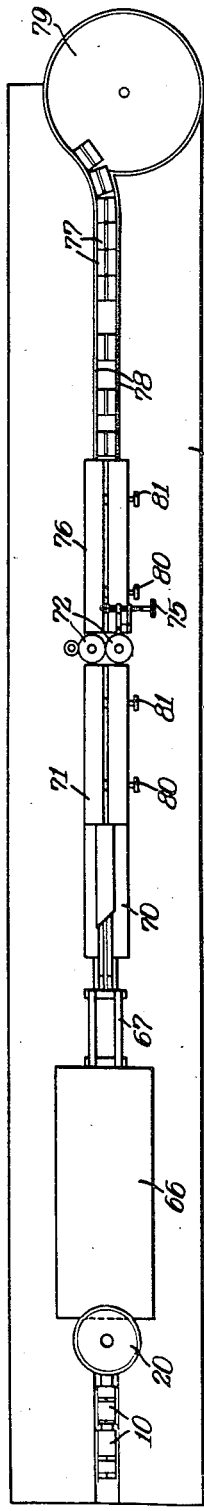
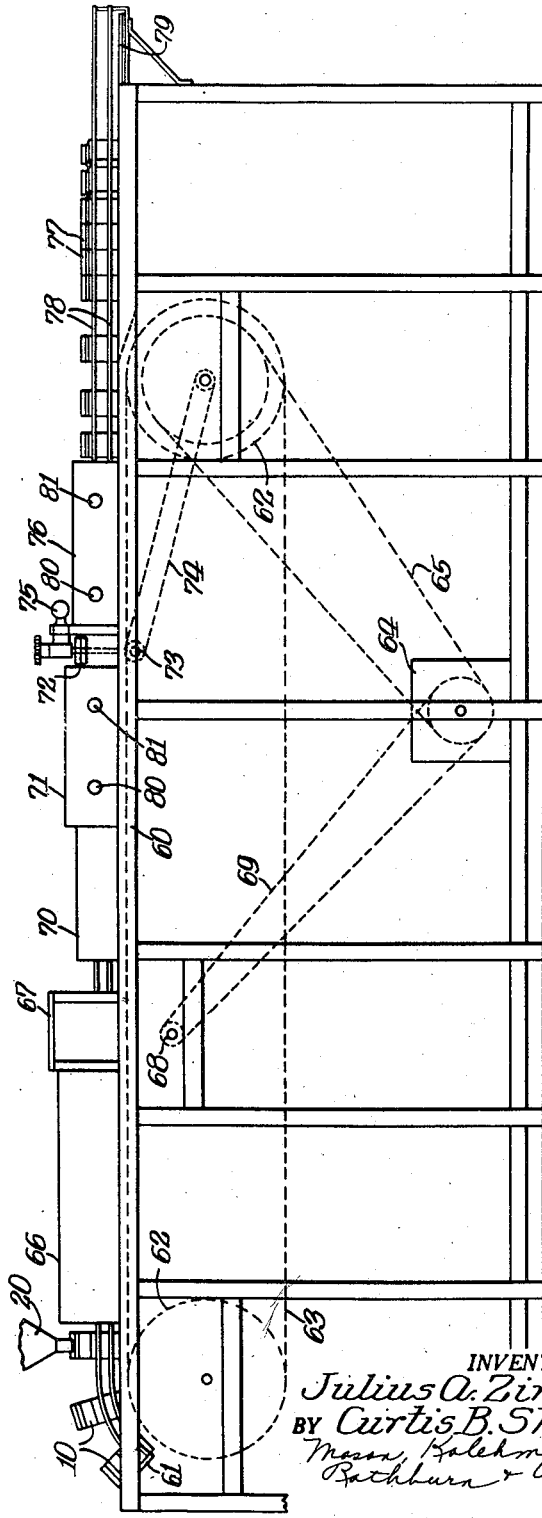
INVENTORS.
Julius A. Zinn, Jr.,
BY Curtis B. Shaw,
Mason, Kolehmainen
Rathburn & Wyss
Attys.

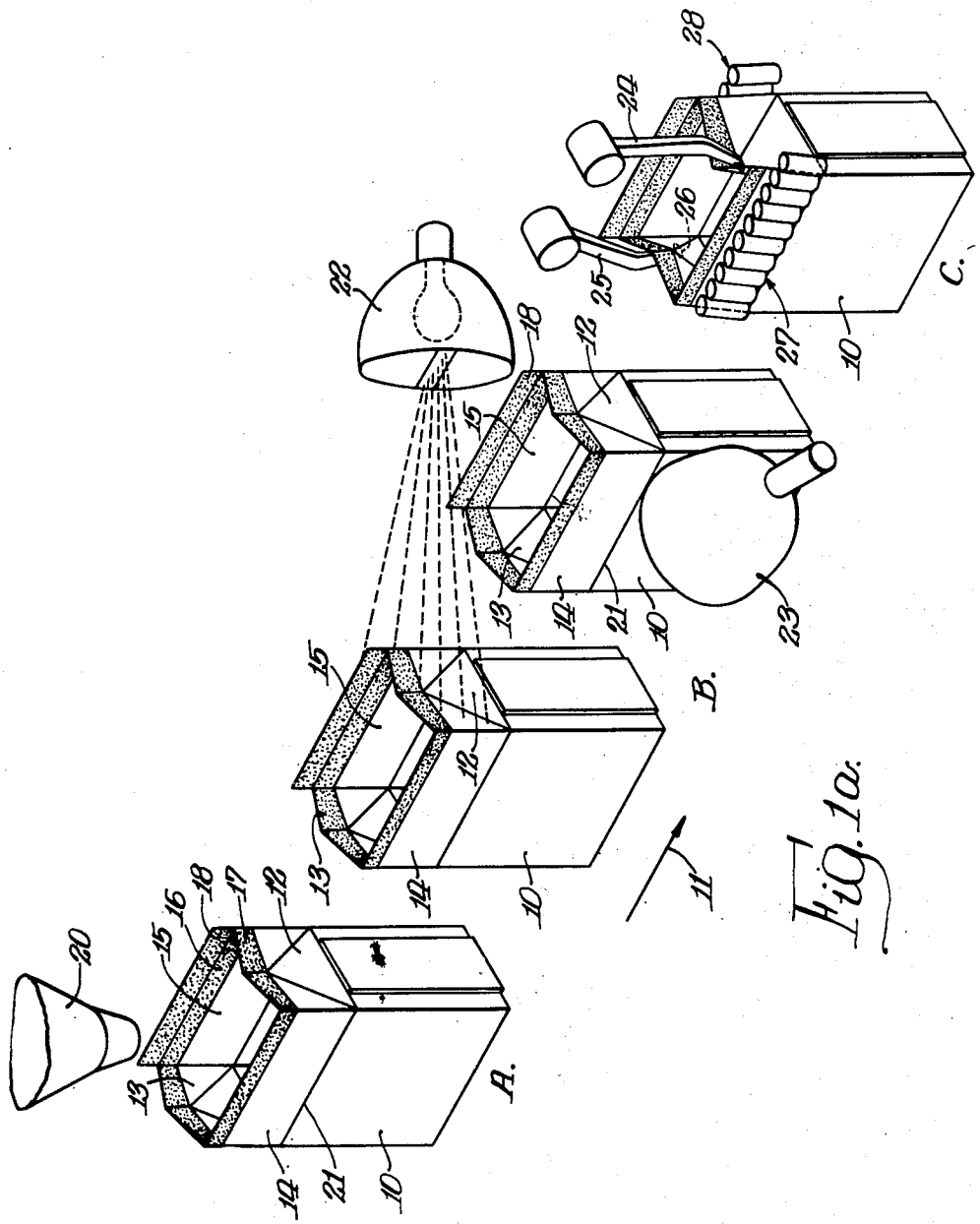

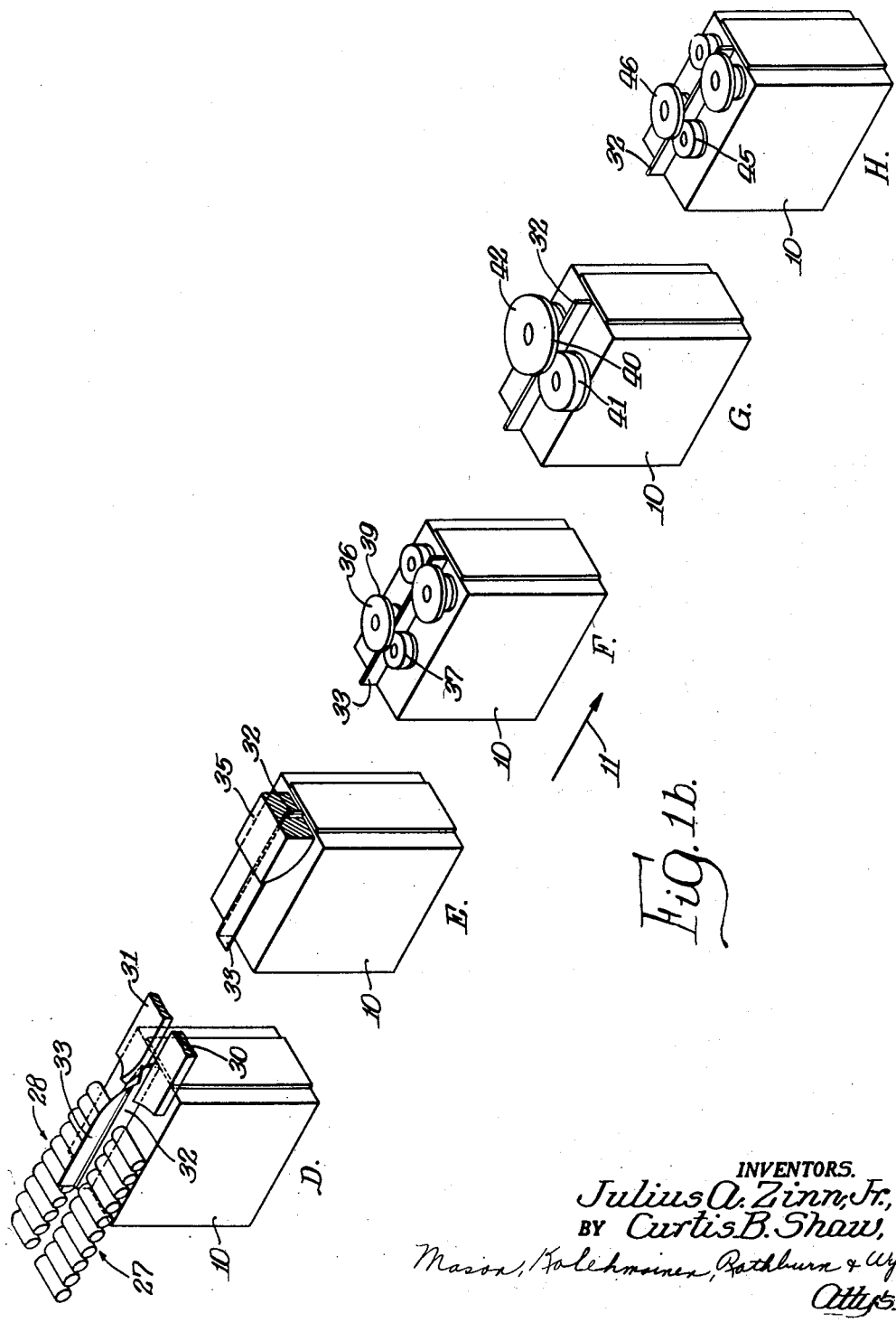

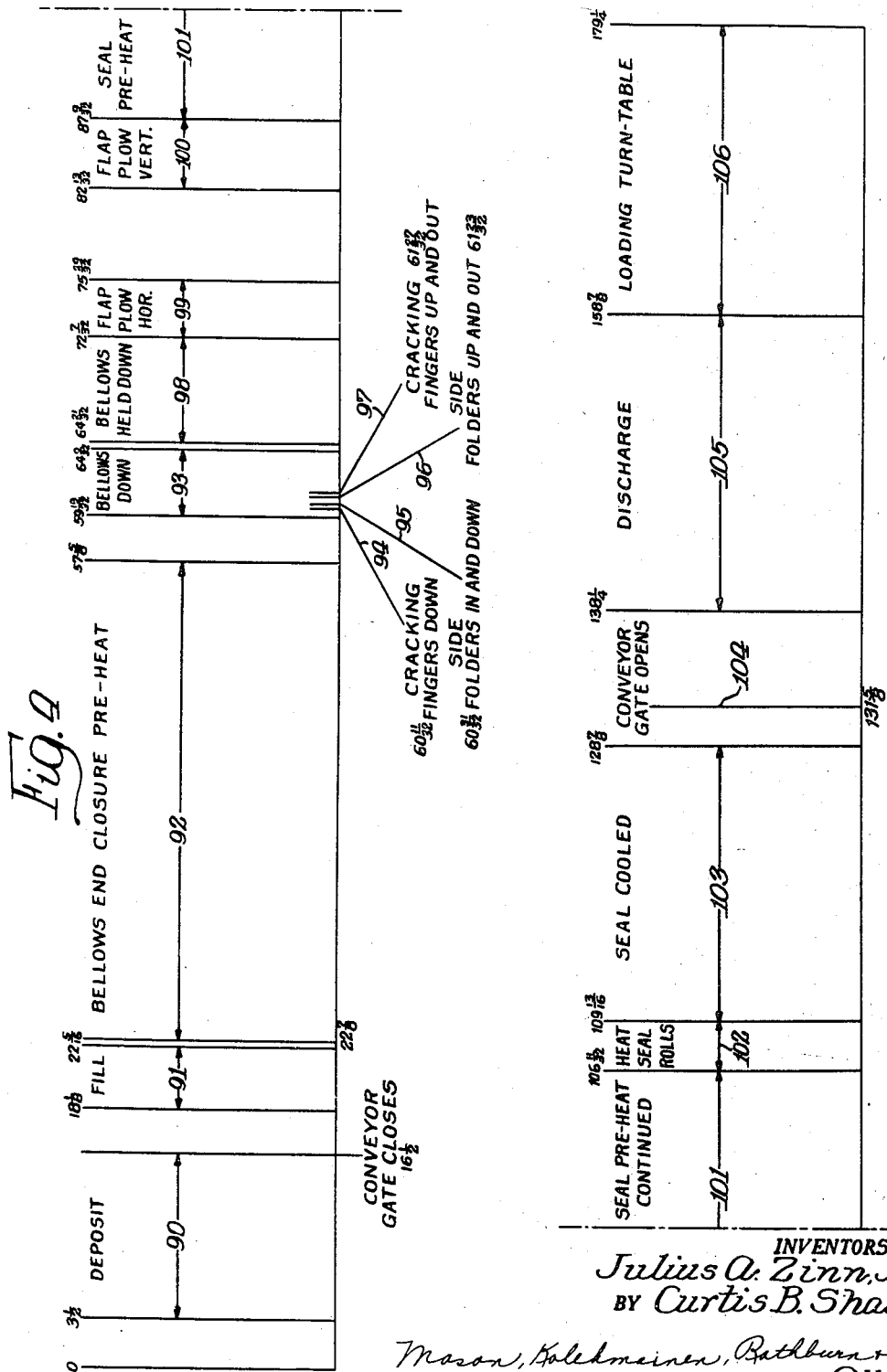

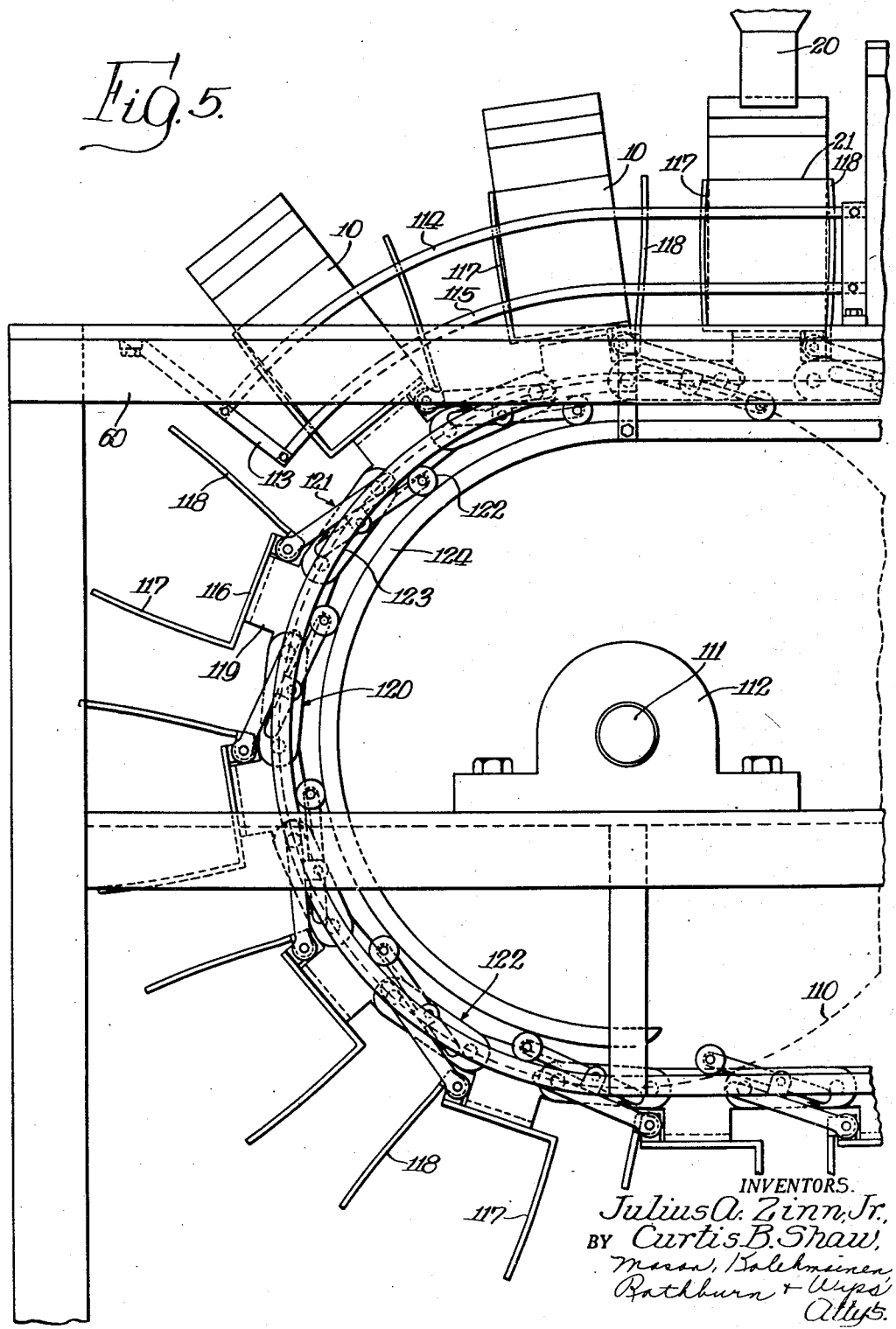

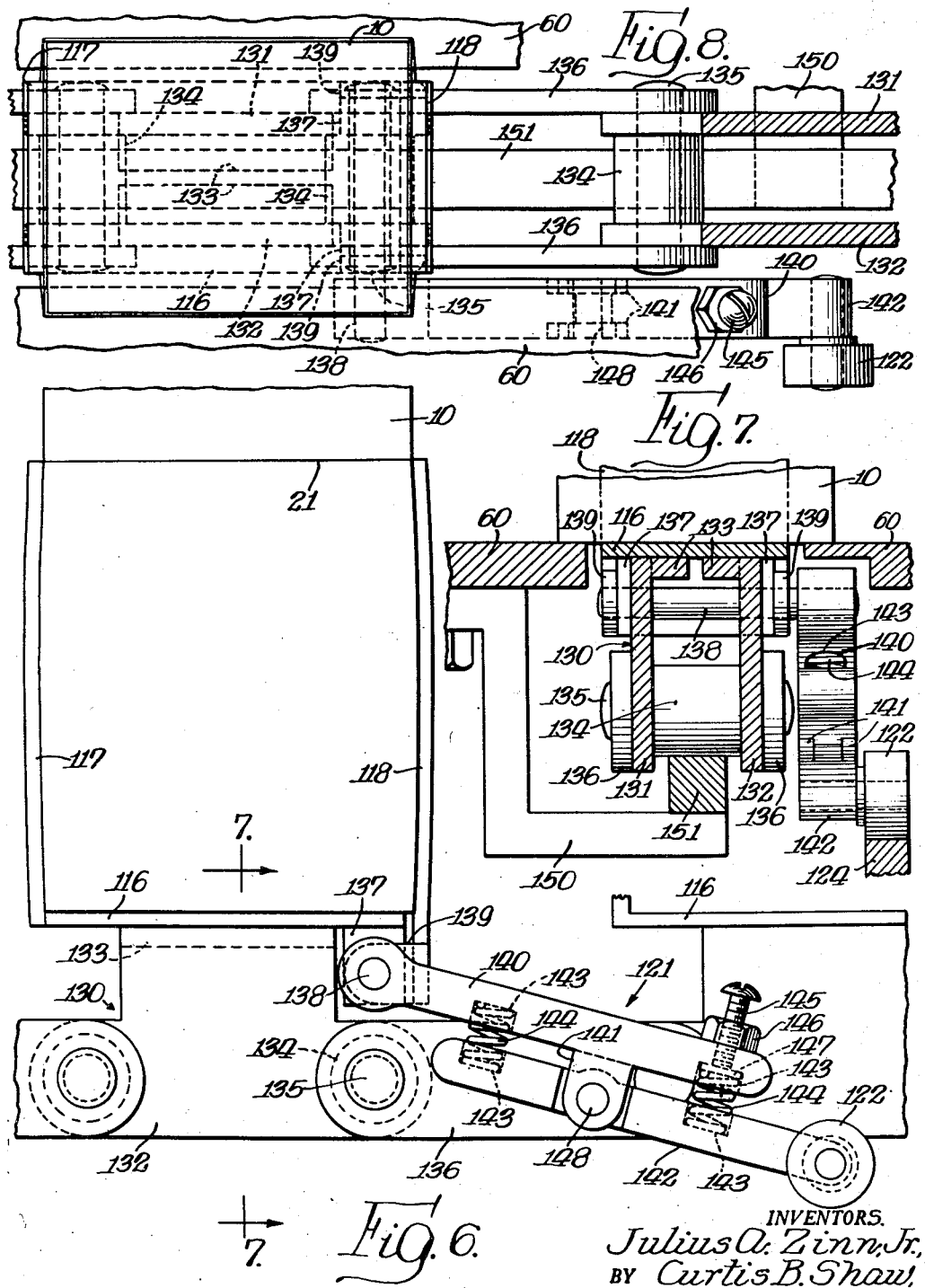

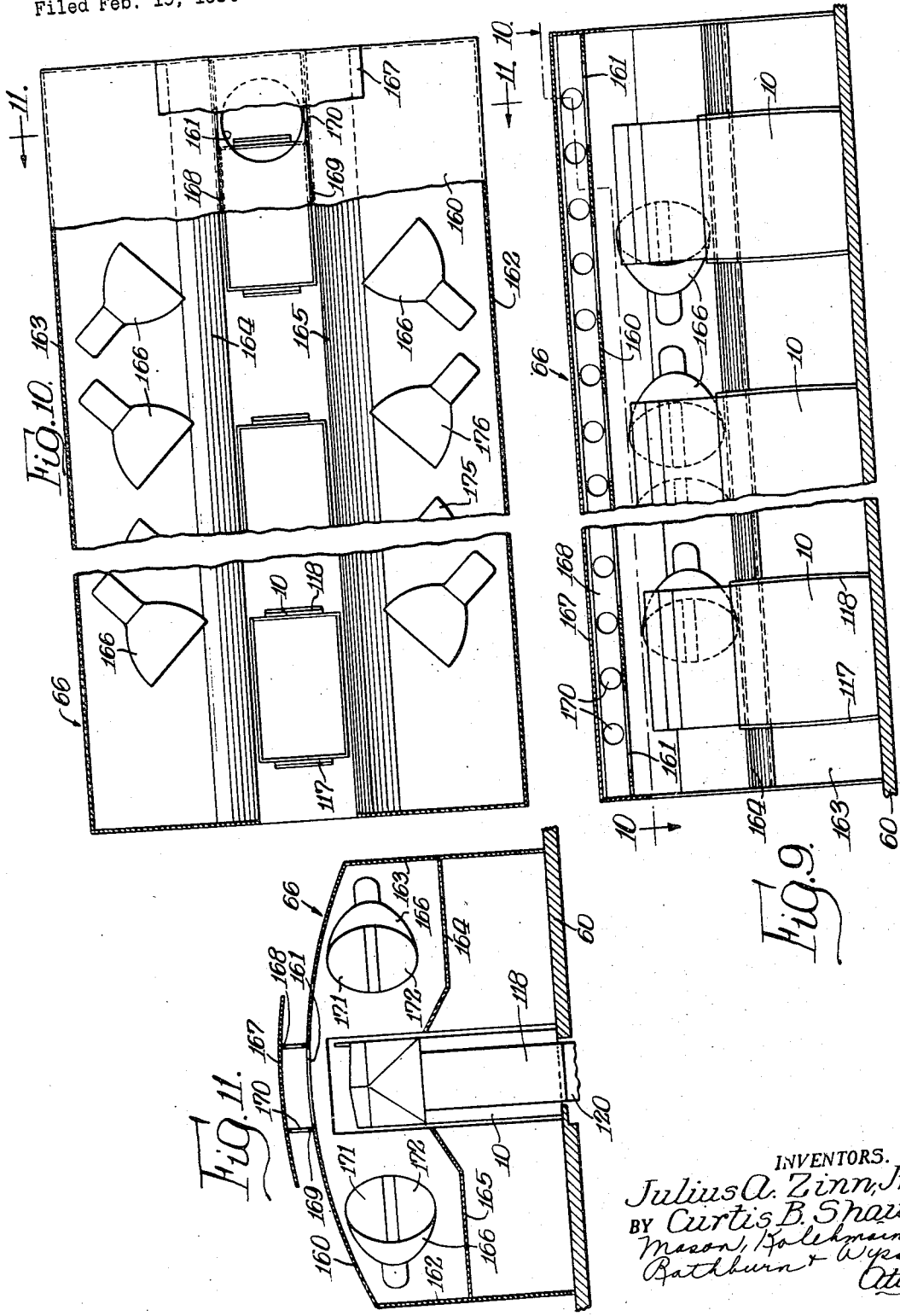

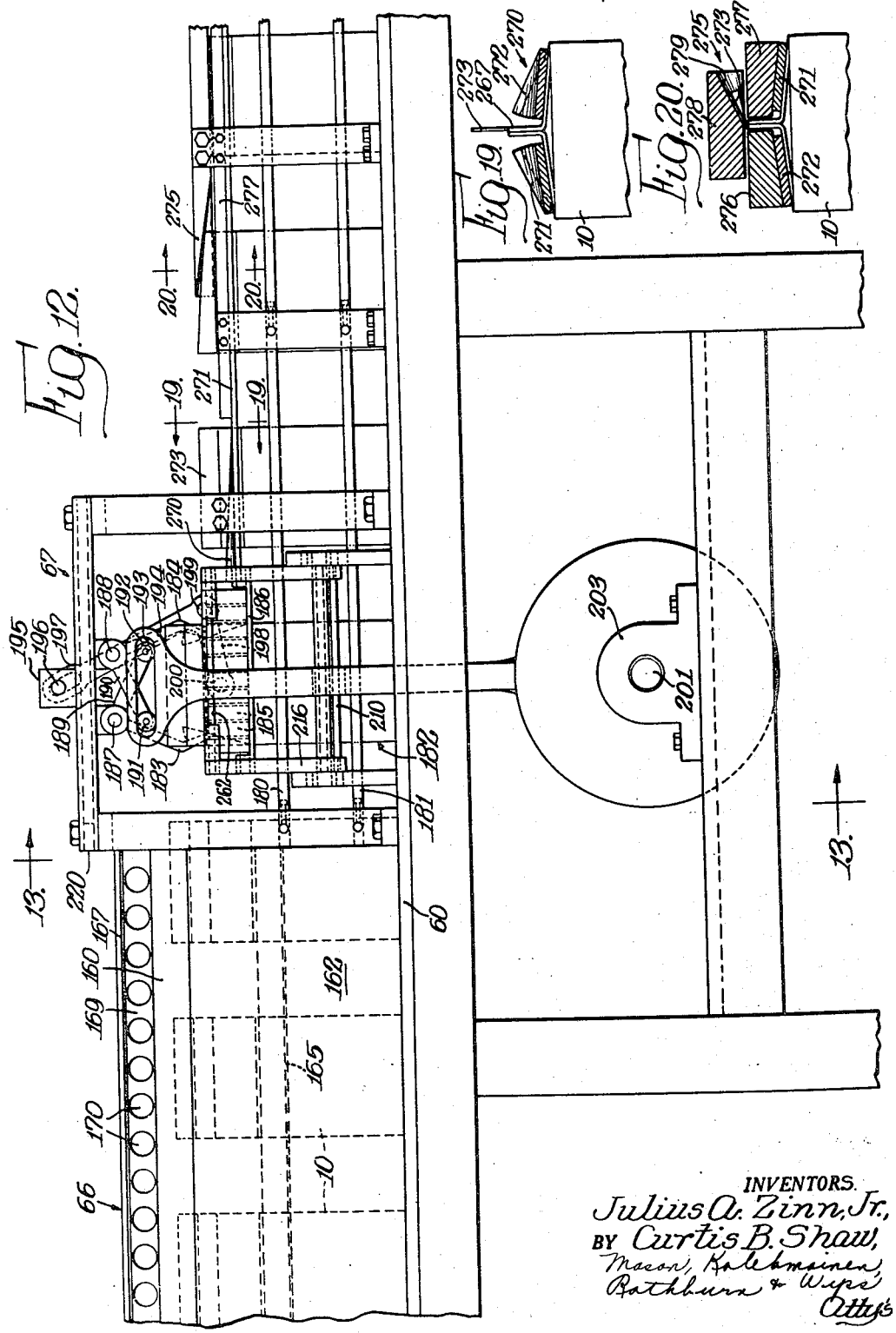

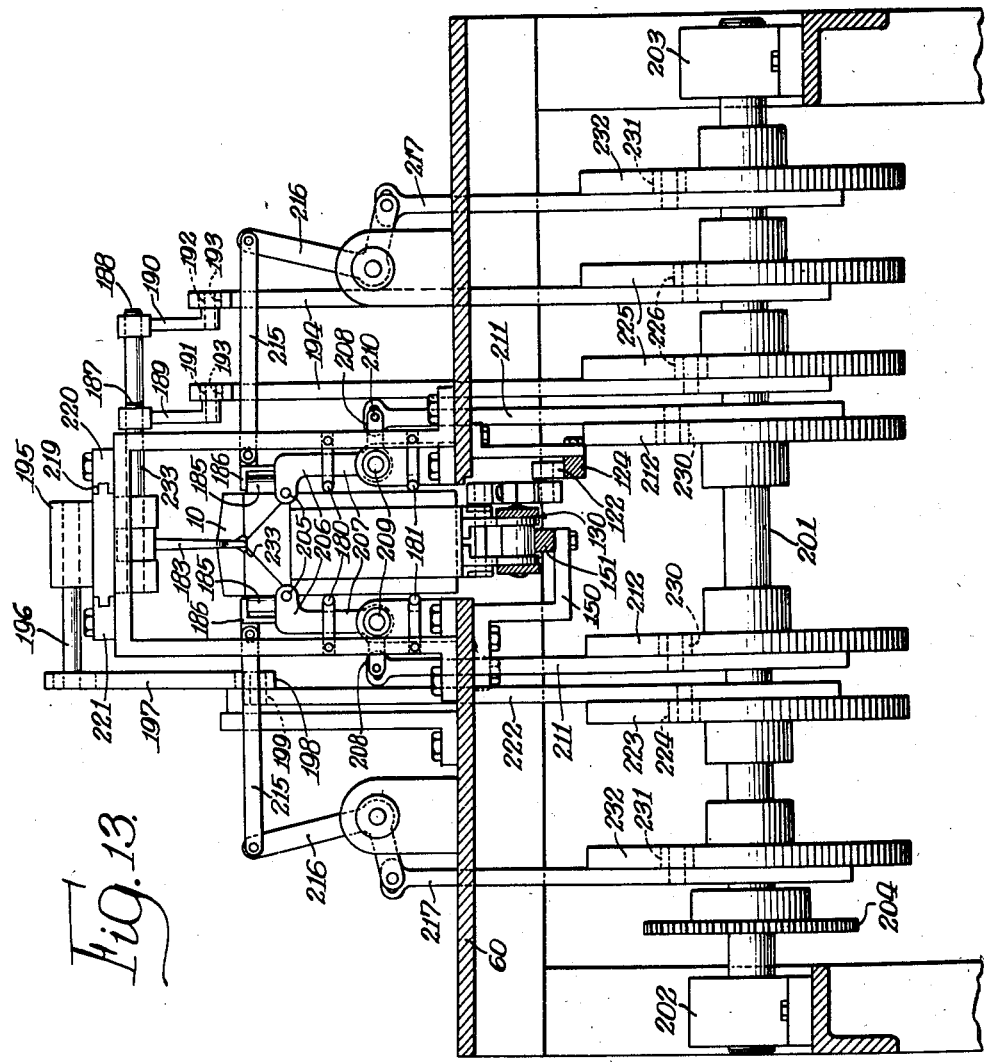

Feb. 11, 1958 J. A. ZINN, JR., ET AL 2,822,653
APPARATUS FOR CLOSING AND SEALING CONTAINERS
Filed Feb. 19, 1954 16 Sheets-Sheet 10

INVENTORS.
Julius A. Zinn, Jr.,
Curtis B. Shaw,
BY
Attys.

Feb. 11, 1958   J. A. ZINN, JR., ET AL   2,822,653
APPARATUS FOR CLOSING AND SEALING CONTAINERS
Filed Feb. 19, 1954   16 Sheets-Sheet 11
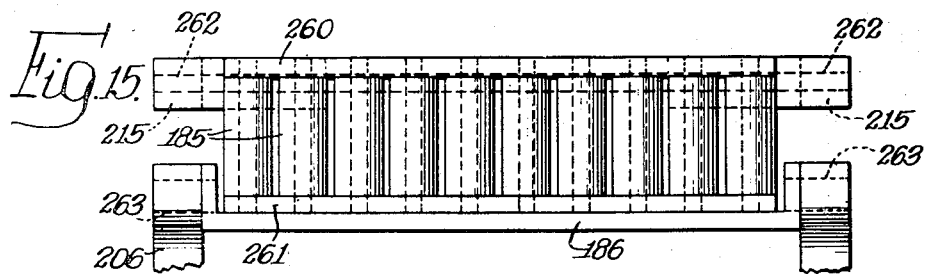
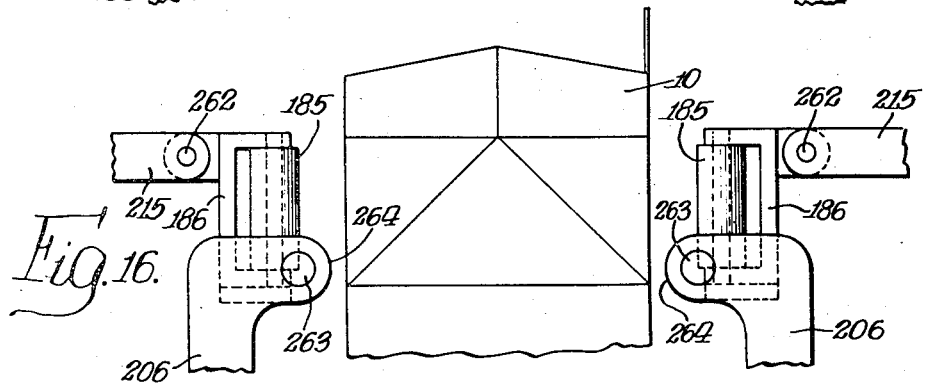
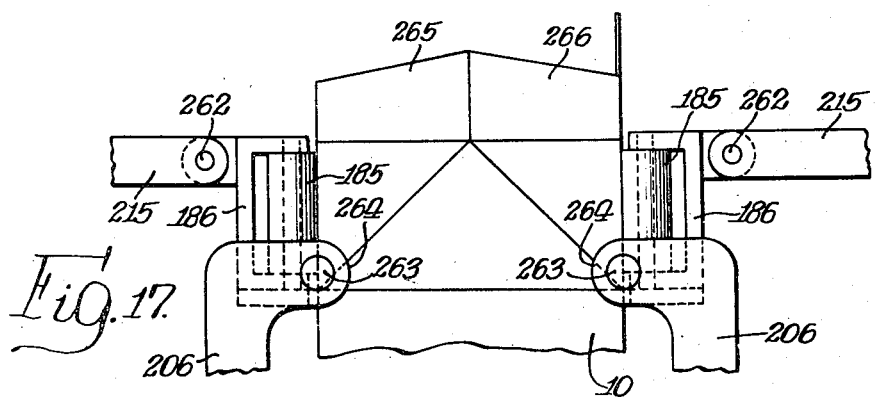
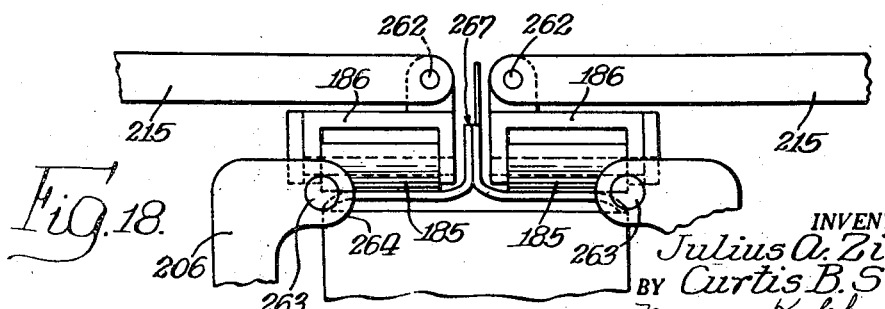
INVENTORS.
Julius A. Zinn, Jr.,
BY Curtis B. Shaw,
Mason, Kolehmainen,
Rathburn & Wyss
Attys.

Feb. 11, 1958 J. A. ZINN, JR., ET AL 2,822,653
APPARATUS FOR CLOSING AND SEALING CONTAINERS
Filed Feb. 19, 1954 16 Sheets-Sheet 12
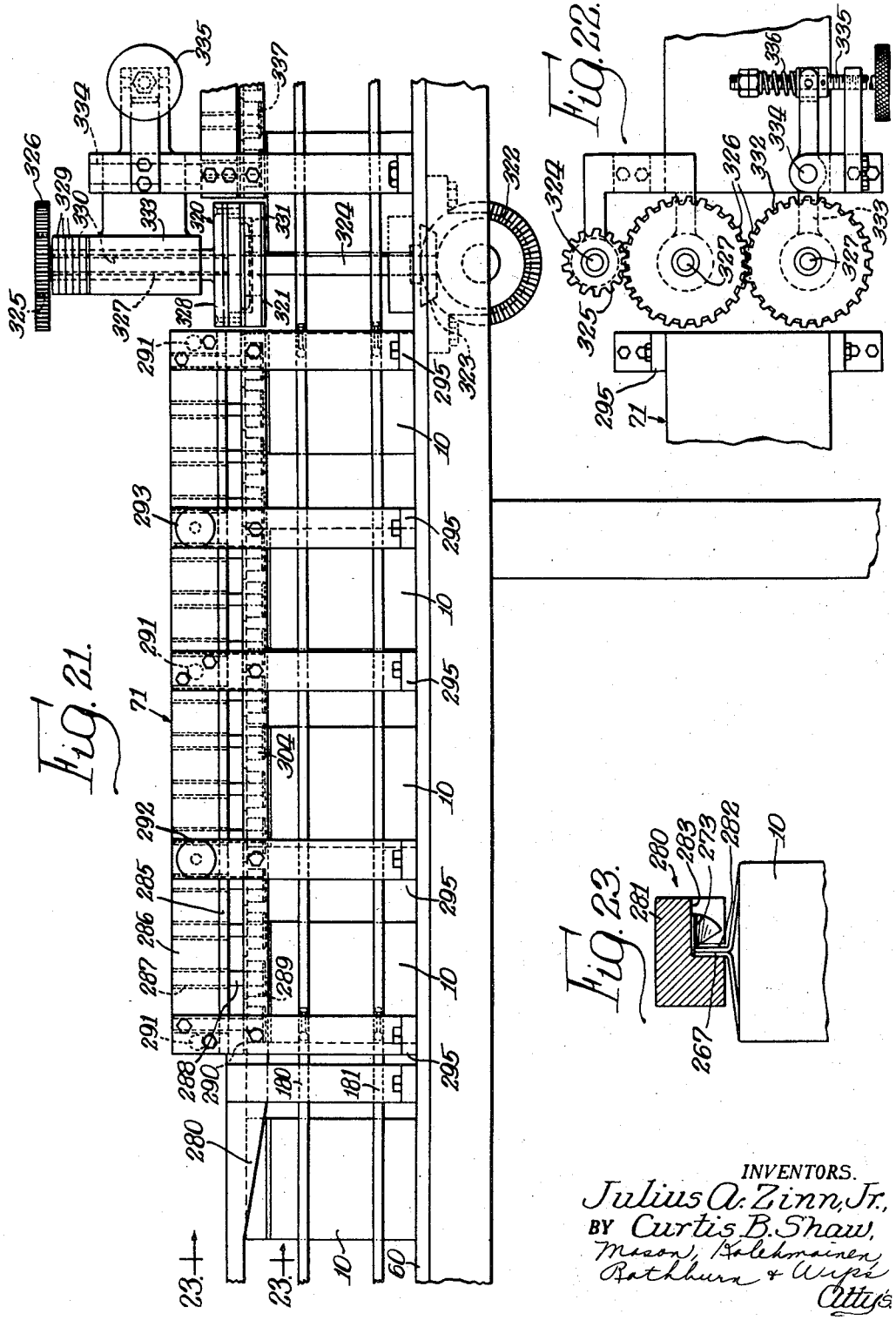
INVENTORS.
Julius A. Zinn, Jr.
BY Curtis B. Shaw,
Mason, Kolehmainen,
Rathburn & Wyss
Attys Feb. 11, 1958   J. A. ZINN, JR., ET AL   2,822,653
APPARATUS FOR CLOSING AND SEALING CONTAINERS
Filed Feb. 19, 1954   16 Sheets-Sheet 13

INVENTORS.
Julius A. Zinn, Jr.
Curtis B. Shaw
BY
Attys.

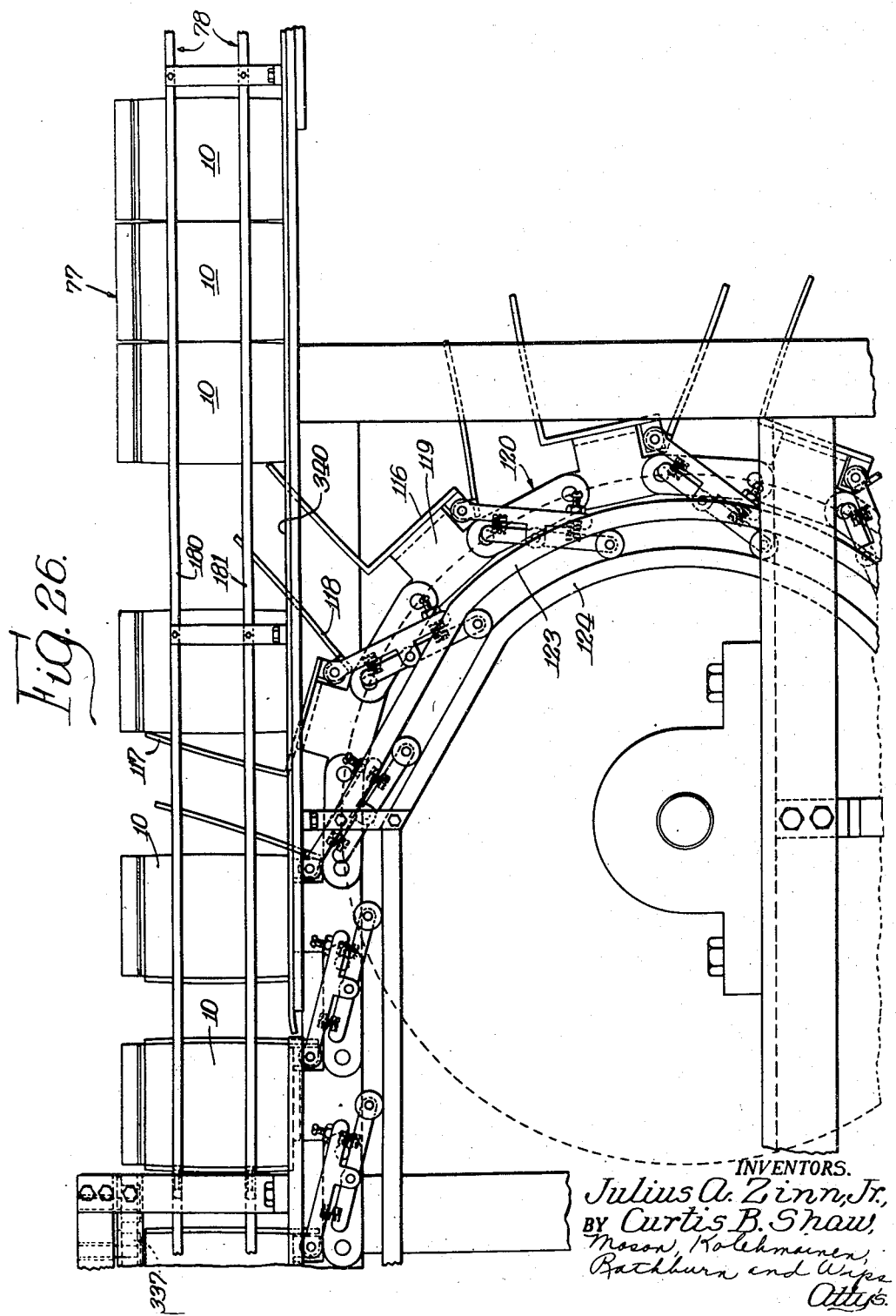

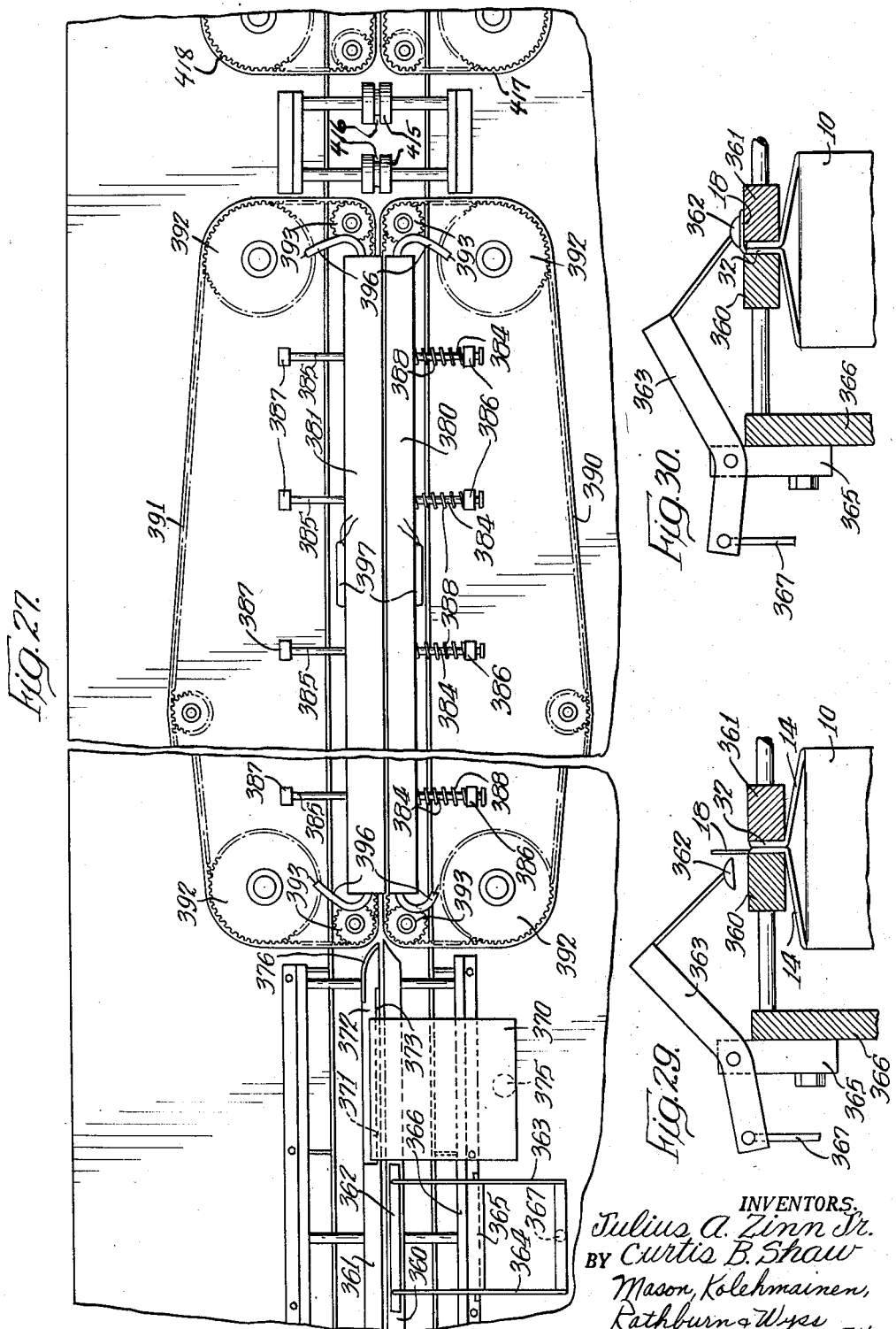

Feb. 11, 1958  J. A. ZINN, JR., ET AL  2,822,653
APPARATUS FOR CLOSING AND SEALING CONTAINERS
Filed Feb. 19, 1954  16 Sheets-Sheet 16
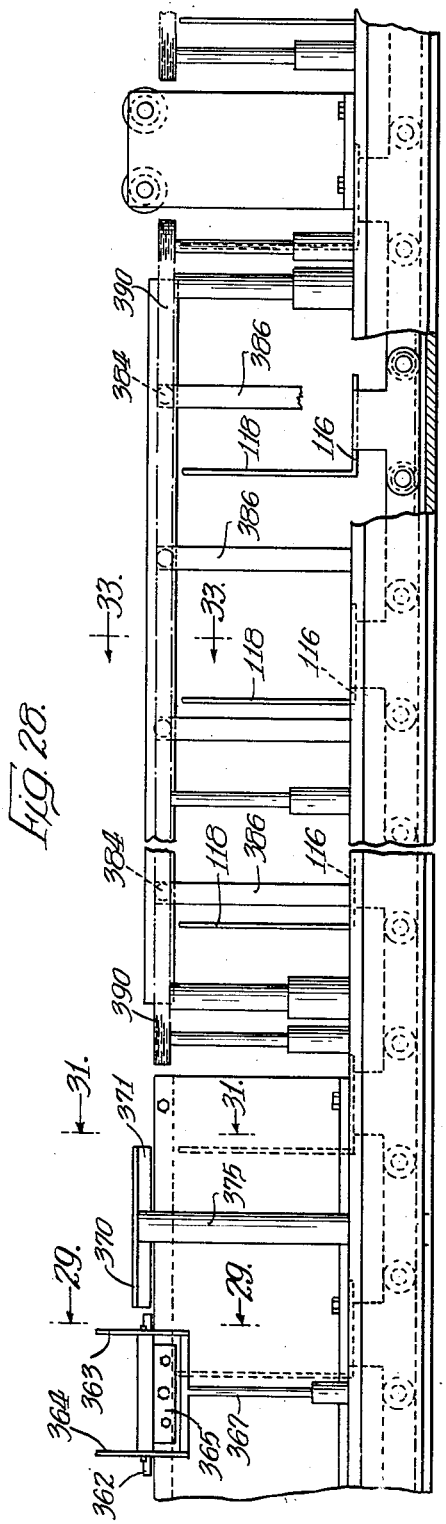
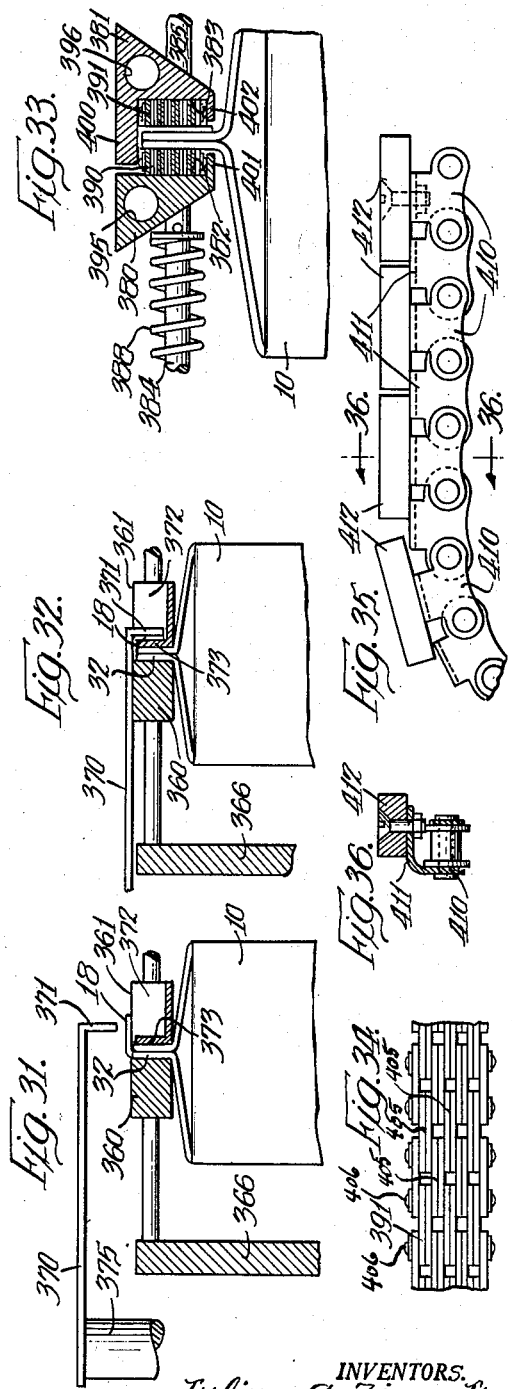
INVENTORS.
Julius A. Zinn Jr.
BY Curtis B. Shaw
Mason, Kolehmainen, Rathburn & Wyss
Attys.

United States Patent Office 2,822,653
Patented Feb. 11, 1958

2,822,653

APPARATUS FOR CLOSING AND SEALING CONTAINERS

Julius A. Zinn, Jr. and Curtis B. Shaw, Chicago, Ill.; said Shaw assignor to said Zinn Application February 19, 1954, Serial No. 411,394

5 Claims. (Cl. 53—373)

The present invention relates to methods of and apparatus for closing and sealing containers, and, more particularly, to methods and apparatus for closing and sealing paraffined or similarly treated paper board containers of the type having an open mouthed portion scored along predetermined fold lines to form a full depressible bellows type end closure. Specifically, the present application is a continuation-in-part of our copending application, Serial No. 156,736, filed April 19, 1950, now Patent No. 2,669,815, issued February 23, 1954.

Although not specifically limited thereto, methods and apparatus embodying the present invention are particularly designed for use with, and will be hereinafter described in connection with containers of the type disclosed in a prior Patent No. 2,412,666 issued December 17, 1946, to Julius A. Zinn, Jr. Such containers, which preferably are formed from moisture proofed and preferably paraffin coated or similarly treated pasteboard cartons, are provided with fully depressible bellows type closures in which the end walls of the mouth portion are collapsed inwardly and then closed to form with the side walls of the mouth portion an elongated upstanding closure rib. The closure rib thus formed is preferably sealed by folding thereover a flap formed as an extension of one of the side walls of the mouth portion. In order to reduce leakage difficulties and to produce well sealed containers on a mass production basis, it is desirable to provide fully automatic apparatus for closing and sealing such containers. For example, a particular method of and apparatus for automatically closing and sealing containers of the above type is disclosed in an application of Julius A. Zinn, Jr.—Serial No. 72,828 which was filed on January 26, 1949, now Patent No. 2,575,544, issued November 20, 1951. It has been found that when the fully formed closure rib of the container is heat sealed by forcing the container through heated rollers or the like, buckling of the container may result due to the drag exerted on the closure rib by the pressure heat-sealing apparatus. Accordingly, it is an object of the present invention to provide automatic closing and sealing apparatus of the above described type wherein facilities are provided for applying sealing heat and pressure to the fully formed closure rib of the container without buckling the side walls of the container during the sealing operation.

It is another object of the invention to provide automatic closing and sealing apparatus of the above described type wherein facilities are provided for exerting pressure downwardly upon the top of the fully formed closure rib of the container while applying sealing heat and pressure to the side walls of the closure rib and while preventing buckling of the side walls of the container during travel through the apparatus.

According to another object of the invention, there is provided novel conveyor apparatus for automatically receiving empty containers, conveying them through the closing and sealing apparatus and automatically discharging the filled, closed and sealed containers.

According to a further object of the invention, there is provided new and improved conveyor apparatus adapted for use in automatic closing and sealing apparatus of the above-described type wherein containers of widely varying dimensions may be accommodated and wherein allowance is made for bulging of the side walls of the container when filled with liquid.

The invention both as to its organization and method of operation, together with further objects and advantages thereof, will best be understood by reference to the following specification taken in connection with the accompanying drawings, in which:

Figs. 1(a)–1(b) when arranged in staggered relation in the order indicated, with Fig. 1(a) at the upper left hand corner, illustrate in perspective the general character of apparatus suitable for carrying out a closing and sealing method embodying the present invention;

Fig. 2 is a side elevational view of a complete closing and sealing apparatus embodying the principles of the present invention;

Fig. 3 is a plan view of the complete apparatus of Fig. 2;

Fig. 4 is a timing diagram illustrating the sequence of steps performed on containers traveling through the apparatus of Fig. 2;

Fig. 5 is a detailed side elevational view of a portion of the conveyor apparatus of Fig. 2;

Fig. 6 is an enlarged side elevational view of a single container basket;

Fig. 7 is a fragmentary sectional view of the member of Fig. 6 taken along lines 7—7 thereof;

Fig. 8 is a plan view, partly in section of the apparatus of Fig. 6;

Fig. 9 is a sectional view of a preheating chamber of the apparatus of Fig. 2;

Fig. 10 is a plan view partly in section of the preheating chamber of Fig. 9 taken along the lines 10—10 thereof;

Fig. 11 is a sectional end view of the chamber of Fig. 9 taken along the lines 11—11 of Fig. 10;

Fig. 12 is a side elevational view of a portion of the apparatus of Fig. 2 following the preheating chamber of Fig. 9;

Fig. 13 is an end view partly in section of the apparatus of Fig. 12 taken along the lines 13—13 thereof;

Fig. 15 is a detailed side elevational view of the side folding mechanism of Fig. 12;

Figs. 16–18 are end views of the side folding mechanism of Fig. 15 illustrating the sequence of movements thereof;

Fig. 19 is a sectional end view of a portion of the apparatus of Fig. 12 taken along the lines 19—19 thereof;

Fig. 20 is a sectional end view of another portion of the apparatus of Fig. 12 taken along the lines 20—20 thereof;

Fig. 21 is a side elevational view of a portion of the apparatus of Fig. 2 immediately following the plowing mechanism of Fig. 20;

Fig. 22 is a plan view of a portion of the apparatus of Fig. 21;

Fig. 23 is a sectional end view of a portion of the apparatus of Fig. 21 taken along the lines 23—23 thereof;

Fig. 26 is a side elevational view of the discharging portion of the apparatus of Fig. 2;

Fig. 27 is a fragmentary plan view of an alternative embodiment of the invention;

Fig. 28 is a fragmentary side elevation of the alternative embodiment of Fig. 27;

Fig. 29 is a sectional side elevational view of the flap folding apparatus of Fig. 27 taken along the lines 29—29 thereof;

Fig. 30 is a view similar to Fig. 29 and showing the folding member in a different position;

Fig. 31 is a sectional side elevational view taken along the lines 31—31 of Fig. 27;

Fig. 32 is a view similar to Fig. 31 and showing the folddown member in a different position;

Fig. 33 is a section side elevational view taken along the lines 33—33 of Fig. 28;

Fig. 34 is a plan view on a somewhat larger scale of the silent link chain used in the heat sealing portion of the embodiment shown in Fig. 27;

Fig. 35 is a fragmentary side elevational view of an alternative chain arrangement which may be employed in the apparatus of Fig. 27; and Fig. 36 is a sectional view taken along the lines 36—36 of Fig. 35.

Figure 14:
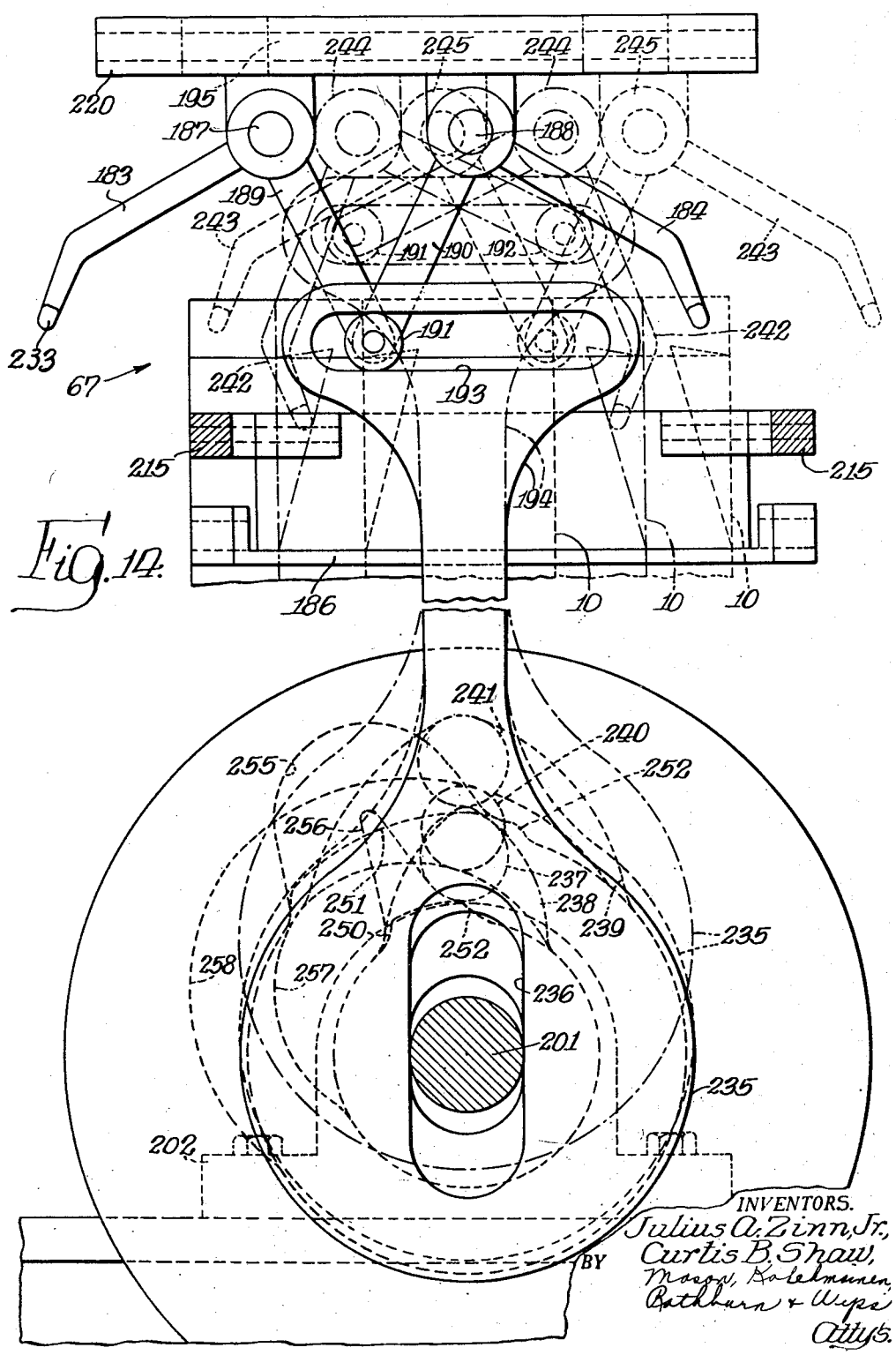
Fig. 14 is an enlarged side elevational view of a portion of the apparatus of Fig. 12.

Referring now to the drawings, the invention is illustrated generally in Figs. 1(a) through 1(b) inclusive as applied to a series of containers 10 of the type disclosed in the aforesaid prior patent, which containers are conveyed by suitable apparatus to be described in more detail hereinafter, in the direction of the arrow 11, the particular positions at which various steps in the closing and sealing operations are performed being illustrated as positions A through H, inclusive. The containers are preformed to provide a substantially rectangular body portion surmounted by an open mouthed portion comprising scored inwardly collapsible end panels 12, 13 and suitably scored inwardly foldable side panels, 14, 15, each of the panels having an upper edge portion of the inner surface thereof coated with a suitable adhesive coating of the hot melt type as indicated by the reference numeral 16. In addition, the end panels 12, 13 and the side panel 14 is provided with a similarly coated portion on the outer surface thereof as indicated by the reference numeral 17, and the side panel 15 includes an upstanding closure flap 18, the inner surface of which is likewise coated with a hot melt adhesive. It is the usual practice, particularly where the containers are to be employed for liquid or semi-liquid materials, to form the container from suitably shaped blanks to which the adhesive has been applied in the portions 16—18 and then to coat by dipping or another suitable impregnating process the entire container with paraffin or another similar waterproofing material. The waterproofed container thus formed is then ready for filling, closing and sealing, this being accomplished by collapsing the end panels 12 and 13 inwardly and folding the side panels 14 and 15 inwardly and downwardly so that the adhesive coated edge portions of the panels form an upstanding closure rib over which the flap 18 is then folded preparatory to the final sealing operation.

In the apparatus of the present invention, the open mouthed container 10, which is received by suitable conveyor apparatus to be described in more detail hereinafter, is carried to position A wherein suitable filling apparatus indicated generally at 20 is utilized to fill the container to the score line 21 along which the bellows type end closure is formed. The filled container then proceeds to position B in which area the side and end panels of the mouth portion of the container are subjected to heat through the medium of suitable heat sources illustrated generally in Fig. 1(a) as the radiant heat lamps 22, 23. The heat lamps 22, 23 are preferably masked by any suitable means to concentrate the heat upon the side and end panels of the containers and particularly to concentrate the heat upon the score lines of these portions of the container. The heat transmitted to the score lines of the mouth portion of the container during its travel through the zone illustrated as position B is preferably sufficient to soften the paraffin along the score lines of the mouth portion of the container so as to facilitate the initial "cracking" or preforming of the bellows type end closure.

Containers, the mouth portions of which have been preheated at position B, are immediately conveyed to position C wherein a pair of fingers 24, 25 move inwardly and downwardly to engage the end panels substantially at the apex of the triangular shaped score lines formed in the end panels, the points of contact of the fingers 24, 25 with the end panels being illustrated in dotted lines at 26. Inasmuch as the fingers 24, 25 strike the end panels of the open mouthed portion sufficiently to crack the container along the preformed score lines thereof, these fingers are termed cracking fingers.

Substantially simultaneously with the cracking of the end panels by the fingers 24, 25, a pair of side folders indicated generally at 27, 28 are moved inwardly to engage the upstanding side panels of the mouth portion of the container and are pivoted endwise to a substantially horizontal position so that the side panels of the mouth portion are folded flat and the adhesive coated edge portions of the panel form an upstanding closure rib. Preferably the side folders 27, 28 each comprise a series of rolls which are mounted for pivotal movement as a unit and which engage the outer surfaces of the side panels in a manner to be described more fully hereinafter. The preheated mouth portion of the container is thus preformed by means of the cracking fingers 24, 25 and side folders 27, 28 to a shape substantially similar to that of the finished product. By preheating the mouth portion of the container immediately before the preforming thereof and after the filling of the container, the amount of heat supplied to the container mouth portions and the length of time the containers are subjected to heat is kept at a minimum.

With the bellows and closure in substantially fully depressed condition, the containers are then conveyed to position D wherein suitable plow members illustrated generally at 30, 31, and positioned along the line of travel of the upstanding closure rib 32 of the container, engage the upstanding closure flap 18 and fold the same to a substantially horizontal position. The containers are then conveyed to position E wherein a further plow mechanism illustrated generally at 35 engages the horizontally extending portion of the closure flap 18 and folds it over the remaining sections of the closure rib 32 to provide a fully formed closure rib which is ready for sealing.

The containers are then conveyed to position F at which position the sides of the upstanding closure rib 32 are preheated by means of a series of suitable heated rollers 36 and 37. The rollers 36, 37 engage the sides of the closure rib 32 thus preheating the sides of the closure rib before the application of sealing heat and pressure so that the paraffin coating of the members forming the closure rib is melted and the hot melt adhesive is softened. By such an arrangement, the subsequent application of sealing heat and pressure does not produce scorching of the outer surfaces of the closure rib due to the fact that individual sections of the multiple thickness closure rib have been preheated to a uniform temperature close to that necessary to achieve complete sealing.

In order to provide a uniform sealing action of the upstanding closure rib, one roller of each of the series of paired rollers, as for example, the roller 36, is provided with a flanged portion 39 which extends over the top of the closure rib and holds the bellows in a fully depressed condition. There is also provided on the bottom surfaces of the series of rollers insulating disks which substantially prevent the transmission of heat from the rollers to the horizontally folded side panels of the containers as will be described in more detail hereinafter. The rollers are thus masked from contact with any portion of the container except the sides and top of the closure rib 32.

In considering the operation of the flanged preheating rollers 36—67, illustrated in position F of Fig. 1(b), it is evident that the multi-section closure rib 32 is of substantial width and if the bellows type end closure is maintained fully depressed by exerting pressure upon the horizontally extending side panels, the overlying closure flap 18 has a tendency to be pulled back over the remaining portion of the rib so as to form an air pocket between the top of the multi-section portion of the rib and the undersurface of the closure flap 18. However, by exerting pressure upon the top of the closure rib, that is, upon the uppermost surface of the closure flap 18, to maintain the bellows fully depressed the formation of an air pocket between the closure flap and the multi-section rib is substantially prevented. There is thus provided an airtight and liquid proof seal between the individual sections of the closure rib. Also, by exerting pressure on the top of the closure rib during preheating thereof, which pressure is illustrated in position F as being applied by the flanges of successive ones of the pairs of rollers 36—37, the top portion of the overlying flap 18 is ironed down so as substantially to conform to the relatively thick portion of the closure rib thus facilitating a uniform, liquid-tight seal when the closure rib is subsequently subjected to sealing heat and pressure. In this connection it will be understood that other suitable means may be provided for exerting pressure on the top of the closure rib 32 such as, for example, a stationary plow member adapted to engage the top surface of the rib. However, the provision of rib engaging flanges on certain ones of the rollers gives the necessary restraining force to accomplish the above described sealing action without materially increasing the cost and complexity of the apparatus.

At position G the pressure rolls 41, 42, which are heated by suitable means to be described in more detail hereinafter, engage the sides of the closure rib 32 and exert sufficient pressure thereon and apply sufficient heat thereto to melt the softened hot melt adhesive thereby to form a uniform, liquid-tight seal of the closure rib 32. One of the pressure rollers, as for example, roller 42, is provided with an overhanging flange portion 40 which engages the top of the closure rib 32 to maintain the bellows and closure fully depressed. Immediately following the pressure sealing operation at position G, the containers are conveyed to position H wherein opposed series of cooling rollers indicated generally at 45, 46 which are substantially similar to the preheating rollers of position F, engage the sides of the fully formed and sealed closure rib 32 to cool and set the sealed closure rib. As in the case of the preheating rollers, certain ones of the cooling rollers 45, 46 are provided with flanges which engage the top of the closure rib 32 and maintain the bellows fully depressed during the cooling and setting operation.

Still considering the fully automatic closing and sealing apparatus of the present invention as a whole, but referring more specifically to apparatus utilized to accomplish the steps perspectively illustrated in Figs. 1(a) and 1(b), there is illustrated in Fig. 2 a complete apparatus suitable for accomplishing the above-described closing and sealing operations. Thus, referring to this figure, the complete apparatus is illustrated as comprising a supporting table 60 on which is positioned the apparatus of the present invention suitable to perform the proper closing and sealing operations upon the containers. The supporting table 60 is provided at one end thereof with a container receiving area 61 in which may be deposited empty open-mouthed containers from any suitable source. The empty containers are deposited in the area 61 on a suitable conveyor apparatus, the conveyor being illustrated generally as comprising sprocket wheels 62 which engage an endless conveyor chain or belt 63, the chain 63 serving to support the container receiving baskets of the apparatus. To drive the chain 63 there is provided a suitable driving source 64 which is illustrated as connected to a sprocket wheel 62 by means of a driving chain 65. Containers which are deposited on the conveyor belt mechanism are moved continuously forward to the filling mechanism 20 wherein they are filled with the desired liquid or other material.

The filled containers then pass to a first preheating chamber 66 wherein the score lines of the mouth portion of the container are heated to facilitatae bending, or cracking, thereof as described in connection with position B illustrated in Fig. 1(a). Containers, the mouth portions of which have been preheated, are then conveyed to the end panel cracking and side panel folding mechanism indicated generally at 67. In order properly to time the operation of the cracking fingers and side folders of the mechanism 67 with the moving containers, there is provided a timed drive shaft 68 which is directly connected with the shaft of the driving motor 64 through the chain 69.

Containers which have been preformed by the cracking and folding mechanism 67 are then conveyed to suitable plowing mechanism 70 in which the closure flap of the upstanding closure rib of the container is folded down to form a complete closure rib ready for heating and sealing thereof. Containers in which the closure rib is fully formed are then conveyed to a second preheating chamber 71 in which heated rollers engage the sides of the closure rib to melt the paraffin coating and to soften the hot melt adhesive of the rib in the manner described in connection with position F illustrated in Fig. 1(b). The containers are then passed through heated pressure rollers 72, the rollers 72 being driven by means of a suitable geared drive shaft 73 which is connected to the driven sprocket wheel 62 by any suitable means such as belt 74 or the like. To vary the pressure exerted by the rollers 72, and accommodate containers of varying thicknesses, there is provided an adjusting knob 75 which operates to adjust the separation between the pressure rollers 72. Containers having completely sealed closure ribs are then passed through a cooling chamber 76 wherein the closure rib is cooled by contact with suitable rollers as has been described in connection with position H illustrated in Fig. 1(b).

The sealed containers which emerge from the cooling chamber 76 are then conveyed to the terminus of the conveyor chain from which they are pushed to form a solid line 77 of filled containers, the container line being guided by means of side rails 78. The side rails 78 guide the solid line of filled containers to the edge of a freely rotatable turntable 79; pushing onto the turntable of successive ones of the filled containers and thus causing the turntable to rotate so as to provide automatic loading thereof. The filled containers may then be removed from the loaded turntable either manually or by any suitable automatic mechanism.

In Fig. 3 there is illustrated in plan view the complete apparatus of Fig. 2. This figure illustrates more clearly the in-line arrangement of the filling, preheating before folding, folding, preheating before sealing, sealing and cooling apparatus of Fig. 2. This figure also illustrates more clearly the manner in which the solid line 77 of filled containers is guided by means of side rails 78 onto the turntable 79, the rails 78 extending completely around the periphery of the turntable to provide complete loading thereon of filled containers.

In order to correlate the successive operations described generally in connection with Figs. 1(a) and 1(b) and performed by the apparatus disclosed generally in Figs. 2 and 3, there is illustrated in Fig. 4 a timing diagram wherein the sequence of successive operations performed by the apparatus of Fig. 2 are illustrated in terms of inches of travel of the conveyor 63. Thus, referring to Fig. 4, the containers are illustrated as being deposited upon the conveyor during the zone of travel indicated by the numeral 90, during which zone of travel the empty containers are deposited in container baskets of the conveyor apparatus and at the end of which zone of travel the conveyor gate associated with each container basket closes so as securely to hold the container for travel through the remaining filling, closing and sealing operations. Containers are then filled during travel through a succeeding zone 91, following which they are conveyed through an end closure preheating zone illustrated by numeral 92. In the end closure preheating zone 92 the mouth portion of the container is heated along the score lines thereof so as to melt the paraffin coating and prepare the mouth portion of the container for subsequent cracking and forming of the bellows.

After conditioning the mouth portion of the container for forming of the bellows end closure, the container is then conveyed to a bellows forming zone 93 in which the following sequence of operations takes place:

(1) Cracking fingers move inwardly and downwardly to engage the apex of the score lines of the end panels (illustrated by the conveyor position 94).

(2) Side folders move in and down to flatten the side panels and to form an upstanding, transversely extending closure rib (illustrated as occurring at 95).

(3) Side folders are up and out (illustrated by the conveyor position 96).

(4) Cracking fingers are up (illustrated by the conveyor position 97).

With the bellows thus preformed to approximately the correct configuration, the side panels are pressed downwardly in a bellows hold down zone 98 following which the closure flap is plowed to a horizontal position in the succeeding zone 99. After the flap has been folded to a horizontal position, the container is moved to a further plowing zone 100 wherein the flap is folded to a substantially vertical position.

The container, which is now provided with a fully formed closure rib, is then conveyed through a sealing preheat zone 101 as has been discussed in connection with position F illustrated in Fig. 1(b). Containers, the closure ribs of which have been preheated to condition the same for final sealing, are then passed through heated sealing rollers in the zone indicated by the numeral 102. Following the pressure sealing zone 102 there is provided a cooling zone 103 during travel through which the sealed closure ribs of the containers are cooled and set. The conveyor basket gate mechanism opens at position 104 and the filled containers are pushed in a solid line through a discharging zone 105 to the loading turntable zone 106 from which they may be removed by any suitable means.

Referring now in more detail to specific apparatus for accomplishing the above-described sequence of operations, there is illustrated in Fig. 5 the initial, or container receiving, end of the complete conveyor mechanism of Fig. 2. Thus, referring to Fig. 5, the conveyor sprocket wheel 62, the tooth line of which is illustrated by the dotted line 110, is illustrated as supported by a suitable shaft 111 which is journaled within the bearing 112. The container receiving area 61, at one extremity of the supporting table 60, is utilized to deposit the containers on the conveyor apparatus. More specifically, the conveyor apparatus is provided with a series of container baskets, each of which comprise a platform member 116 and associated end member 117 which cooperate with a hinged end member, or container basket gate 118, to form a U-shaped support, the end members of which engage the end walls of the supported container. The end gates 117, 118 are of a width somewhat less than the corresponding dimension of the container. Containers which are placed in the container baskets are guided endwise along the conveyor by means of upper and lower guide rails 114, 115, it being understood that a second set of guide rails, spaced from the guide rails 114, 115 by an amount equal to the width of the container are utilized to guide the container. The fixed base and end members 116, 117 are supported on a base portion 119 which is preferably made integral with a link of the conveyor chain indicated generally at 120, successive base members 119 being supported by alternate links. The members 117 and 118 are preferably of a height just equal to or slightly below the score line 21 of the container so that cracking of the end panels along the correct score line is obtained.

To control the movement of the hinged gate member 118, there is provided a pivoted linkage indicated generally at 121 which terminates in a control roller 122, the roller 122 being guided by means of cam guide rails 123, 124 so as to control the movement of the pivoted end member 118 relative to the fixed end member 117 of a particular container basket. The cam guide rails 123, 124 are positioned relative to the tooth center line 110 of the sprocket wheel which supports the conveyor chain 120 so as to open up the container gate member 118 to receive a container. In this connection, it will be understood that the links of the conveyor chain are held at a fixed radius by engagement with the teeth of the sprocket wheel so that the cam guide rails 123, 124 may be conveniently adjusted with respect to the center line of the teeth of the sprocket wheel to provide closure of the container basket gates in the proper timed sequence. As the end members of successive container baskets pass between the guide rails 114 and 115, the containers are seated upon base and end members 116, 117 and the pivoted gate member 118, which is controlled by roller 122, is closed so as to secure the container between the end members 117, 118 when the container basket reaches the horizontally extending upper run of the conveyor chain. Thus, when a container basket reaches the position immediately beneath the filling mechanism 20, the sides of the container support are fully closed so as to engage the container for travel through succeeding stations of the apparatus.

In Figs. 6, 7 and 8 there is illustrated in more detail a particular one of the container baskets supported by alternate links of the conveyor chain. The container basket supporting link indicated generally at 119 comprises a pair of side wall members 131, 132. The uppermost portions of the side wall members 131, 132 extend inwardly as indicated at 133 to form a platform portion on which is positioned the base member 116 of the container basket. The fixed end panel 117 of the container basket is secured to the rear edge of base member 116 by any suitable means so as to provide a support for the bottom and rear end walls of the container. The remainder of the link 119 is formed by a sleeve 134 which is positioned between and spaces apart the side wall members 131, 132 and a linkage pin 135 which extends through the sleeve 134 and side wall members 131, 132 and through aligned apertures in the end portions of the next succeeding link 136.

In order to allow bulging of the container when filled with liquid the end members 117, 118 are preferably bowed outwardly so as to allow filling of the container by the desired amount without causing the liquid level to rise above the point of fold of the bellows type end closure of the container. As is clearly evident in Fig. 6 the end members 117, 118 are given a radius of curvature sufficient to accommodate the bulging walls of a filled container. With this arrangement, the volume of the container is maximized and the level of the liquid introduced into the container may be held below the score line 21 so that subsequent closure of the mouth portion of the container does not interfere with the liquid introduced into the container. In this connection, it will be understood that if the liquid level is above the score line on the side wall of the container, closure of the bellows type mouth portion will be hampered due to the excess of liquid in the area of folding of the mouth portion. By providing the end members 117, 118 with the above-described radius of curvature, the containers are restrained from upper movement due to the fact that they are tightly clamped between upper and lower edges of the end members, although provision is made for bulging outwardly of the container walls when the container is filled with liquid.

In order that the container basket may be opened automatically to receive and discharge containers therefrom, there is provided means for tilting the end wall member 118 of the basket forwardly with respect to the remaining portion of the basket. To accomplish this, the front edge of the base member 116 is provided with a pair of depending ear portions 137 which are provided with aligned apertures adapted to receive a control linkage shaft 138. The end wall 118 is provided with a pair of lug portions 139 having aligned apertures therein adapted to receive the shaft 138. The end wall 118 is rigidly secured to the shaft 138 by any suitable means, such as, for example press fitting the lug portions onto the shaft. A first control arm 140 is also rigidly secured to the shaft 138 at one end thereof. The control arm 140 is provided with an offset portion 141 intermediate the length thereof, the offset portion 141 being positioned within the centrally located aperture in a second control arm 142. The control arms 140 and 142 are provided with recesses 143 which are positioned on either side of the offset portion 141 and which are adapted to receive the end portions of coil springs 144. To adjust the position of control arm 140 with respect to the control arm 142 there is provided an adjustment screw 145 which threads through the end portion of control arm 140 into the aperture 143 and bears against a washer 147 positioned between the coil spring 144 and the bottom of the corresponding recess 143. The screw 145 may be secured in its adjusted position by any convenient means such as the lock nut 146. By such an arrangement the offset portion of control arm 140, which is pivotally secured to the control arm 142 at 148, may be adjusted to provide a particular positioning of the end wall 118 relative to the fixed members 116, 117 of the container basket. By providing coil springs positioned between the extremities of the control arms 140 and 142 the end wall 118 may be opened slightly under stress so as to adapt to slight variations in the dimensions of containers and also to act as a shock absorber in the event that the containers receive a sharp impact during travel through the apparatus. At the ends of the conveyor run the roller 122, which is supported on the free end of the control arm 142 and extends outwardly beyond the edge of the conveyor mechanism, engages the cam rides rails 123, 124 (Fig. 5) so as to tilt the end wall 118 forwardly with respect to the remainder of the container basket to facilitate receiving and discharging of the containers. In this connection, it will be understood that the control linkage comprising control arms 140 and 142 operates substantially as a single control member in response to controlled movement of the projecting roller 122. However, by spring biasing individual members of the control linkage the container baskets may readily adapt to containers of various sizes and a shock absorbing mounting of the containers is obtained.

In order to provide a rigid support for the flexible conveyor chain and the container baskets carried thereby, and, to the end that the bellows type end closure may be held in a fully depressed condition by pressure on top of the closure rib thereof, there is provided means for supporting the individual links of the conveyor chain throughout the upper run of the conveyor. Thus, as illustrated in Fig. 7 there is provided a supporting member 150 which may be clamped to the bottom surface of the supporting table 60 and which projects to a point immediately below the center line of the conveyor chain. The supporting member 150 is provided with a track member 151 which is narrower than the distance between the opposed side wall members 131, 132 of the container basket supporting links of the conveyor chain. The track 151 thus acts as a support upon which the sleeves 134 of the conveyor chain may ride.

In order to preheat the bellows portion of the filled container, there is provided a first preheating chamber, a detailed illustration of which is shown in Figs. 9 through 11. This preheating chamber, which has been designated generally by the reference numeral 66 in connection with Fig. 2, is illustrated in Fig. 11 as comprising a top wall 160 having centrally located ventilating apertures 161 located therein, a pair of side walls 162, 163 and a pair of bottom masking members 164, 165 which are supported by the side walls 162, 163. Containers which have been filled are moved by means of the conveyor 120 down the center of the chamber 66. Positioned on opposite sides of the container path there is provided a plurality of heating lamps 166 which are directed towards the score mouth portion of the moving containers. The bottom members 164, 165 are so shaped as to mask the moving containers below the end closure score lines thereof so that the heat radiated by lamps 166 is concentrated upon the score lines of the mouth portion of the container. The chamber 66 is further provided with a ventilating hood comprising a roof member 167 supported by side members 168 and 169, the members 168, 169 being provided with spaced ventilating apertures 170. In order further to concentrate the heat radiated by the lamps 166, the open ends of the reflectors associated therewith are provided with masking members 171, 172, the masking members 171, 172 defining a horizontally extending slot through which the heat energy may pass to the scored, foldable mouth portions of the container. The lamps 166 may be controlled by suitable rheostat means by which the heat from all lamps is reduced equally.

As is well illustrated in Fig. 10, the heat lamps 166 are preferably positioned in opposed pairs. For example, the rays of the lamps 175, 176 are directed toward each other so as to define a heating zone which will apply heat uniformly to the end and side panels of the passing containers.

Containers which have been preheated along the score lines of the mouth portion thereof are next conveyed to the end panel cracking and side panel folding apparatus discusses generally in connection with position C illustrated in Fig. 1(a) and referred to generally by the numeral 67 in Fig. 2. The specific details of the cracking and folding apparatus 67 and the plow apparatus associated therewith are illustrated more particularly in Fig. 12. In order to guide the containers after they emerge from the preheating chamber 66, and to position the containers for proper engagement with the mechanism 67 there is provided guide rails, two of which are indicated at 180, 181, which are spaced apart by the width of the containers and extend in spaced parallel relation to the conveyor run throughout the remainder of the folding, preheating and sealing operations. The rails 180 and 181 are adjusted by means of set screws 178 and 179 to the width of the container in use. When the container is moved approximately to the position indicated at 182, a pair of cracking fingers 183, 184 move inwardly and downwardly so that the free end of the fingers 183, 184 strike the end panels of the container sharply to crack the end panels along the preheated score lines thereof. The cracking fingers move inwardly to the position shown in Fig. 12 and thus sharply collapse the end panels of the container.

Partial collapsing of the end panels of the container produces a slight inward folding of the side panels of the container. With the cracking fingers in a position partially to collapse the end panels of the containers, the side panels are then engaged by a series of side folding rollers 185 which are journaled for movement as a unit in a frame indicated generally at 186. The rollers 185 are pivoted endwise as a unit to depress the side panels of the mouth portion of the container to a substantially horizontal position. The cracking fingers 183, 184 are pivoted in bearings 187, 188 and are rigidly secured to offset control arms 189 and 190, respectively. The control arms 189, 190 terminate in rollers 191, 192 each of which are movable within transverse slots 193 formed in the upper end of cam operated control arms 194. Each roller 191, 192 is positioned within and guided by a separate cam operated control arm, although only a single control arm 194 is illustrated in Fig. 12. From the foregoing it is evident that vertical movement of the control arms 194 produces an in and out motion of the free end of the cracking fingers 183, 184.

In order to engage the end panels of the container and to crack the same by means of fingers 183, 184 while the container is moving continuously through the apparatus, the bearings 187, 188 are mounted as a unit in a sliding block 195. The sliding block 195 is provided with a projecting pin 196 which is positioned within the slotted end of the upper control arm 197 of a slide actuating linkage. The upper control arm 197 is provided with an offset portion 198 and is pivoted at 199, the other pivotal end 200 of the upper control arm being connected to a cam operated control arm positioned behind the control arm 194 and controlled by specific cam operated mechanism to be described in more detail hereinafter. Thus, vertical movement of control arm 197 produces sidewise movement of the slide block 195 and consequently of the cracking fingers 183 184. The end portion of the upper control arm 197 is slotted to permit upward travel of the end of the arm 197 during rotation about the pivot point 199. Also, the control arms 194 are provided with a transverse slot 193 to permit forward movement of the rollers 191, 192 positioned therein under the action of the slide control linkage 197, 198.

To control the inward and downward movement of the side folding rollers 185, there is provided the cam operated linkages illustrated in Fig. 13. Thus, referring to this figure, there is provided a drive shaft 201 journaled at the extremities thereof in bearings 202 and 203 and driven by means of the gear 204 from the conveyor sprocket wheel, as discussed in connection with Fig. 2. The connecting drive mechanism is preferably of the positive drive type, such as a link chain or the like, so that proper timing of the cam mechanisms positioned on the shaft 201 is obtained with respect to the travel of the conveyor mechanism.

To move the side folding rollers 185 inwardly to a position where they contact the upstanding side panels of the container 10, the lower portion of the roller supporting frames 186 are pivoted at pivot points 205 to the free upper ends of a pair of bell crank control arms 206. The arms 206 are provided with a vertically extending portion 207 and a horizontally extending portion 208, and are pivoted in bearing members 209 for substantially horizontal movement of the free upper ends thereof. The horizontally extending arms 208 are pivotally connected at 210 to the upper end of vertically extending cam operated control arms 211, the control arms 211 being moved vertically in response to movement of cam plates 212 which are secured to and rotated by the shaft 201. The control arms 211 are provided with projecting cam followers 230 which are secured to and project from the side of the control arms 211 to engage a cam slot formed in the cam plate 212, as will be discussed in more detail in connection with Fig. 14. Thus, the cam follower 230 is made to follow the contour of the cam slot so as to translate rotation of the shaft 201 into properly timed vertical motion of control arms 211.

Vertical movement of the free end of the arms 208 causes corresponding horizontal movement of the side folding rollers, these rollers being moved inwardly to a point where they engage the side panels of the container. With the rollers 185 in engagement with the side panels of the container the rollers are then pivoted about the pivot points 205 by means of the linkages comprising horizontally extending control arms 215, bell crank levers 216 and vertically extending cam operated control arms 217. Vertical movement of the arms 217 moves the upper end of the roller supporting frame 186 inwardly so that the rollers move inwardly and downwardly about the pivot point 205 to depress the side panels of the container to a substantially horizontal position.

The control arms 217 are also provided with cam followers 231 which engage corresponding cam guide slots in the driven cam plates 232. The timing of horizontal movement of the arms 215 is thus maintained with respect to the shaft 201 in a manner similar to that provided for the control arms 211.

In Fig. 13 there is also illustrated more clearly the structural details of slide block 195 which slides within grooves 219 provided in side support members 220, 221 and which is controlled through the linkage including control arm 197 and vertically movable cam operated control arm 222. Vertical movement of the arm 222 is provided by the associated cam plate 223 which engages a cam follower 224 which projects from and is rigidly secured to the control arm 222. Fig. 13 also illustrates the control linkage provided to move the cracking fingers 183, 184, which are supported on slide block 195, inwardly and downwardly in timed relation to movement of the container. Thus, cracking finger 183 is secured to shaft 187, which is journaled in slide block 195, and the control arm 189 is connected to the end of shaft 187 and terminates in roller 191 which is positioned within the transverse slot in the end of the cam operated control arm 194. A similar linkage is provided for the cracking finger 184 which pivots about shaft 188 and terminates in roller 192. The control arms 194 are similarly controlled by driven cam plates 225 which engage cam followers 226 associated with individual ones of the control arms 194.

In Fig. 13 there is shown a preferred construction of the end portions of the cracking fingers 183, 184 which partially collapse the scored end panels of the container. Specifically, the cracking finger 183 illustrated in Fig. 13 is provided with enlarged end portion 233, the end portion 233 being of a width approximately equal to the distance between the sides of the scored triangular section of the end panel which is struck by cracking finger 183 when it moves inwardly and downwardly in response to cam operated control arm 194. By striking the end panel at a point spaced slightly from the apex of the triangular scored portion of the end panel, the cracking of the end panel along the scored lines is aided due to the fact that the outer edges of the end portion 233 act as a support against which the panels may be formed.

In order to visualize more clearly the sequence of camming operations, which provide in properly timed relationship vertical movement for the control arms 211, 217, 222 and 194, there is illustrated in Fig. 14 the relative positioning of the cam guide slots of the cam plates associated with particular ones of the vertically movable control arms described in connection with Fig. 13. Thus, referring to Fig. 14, the cracking fingers 183, 184 are indicated in solid lines in their initial uppermost position. In this position, the control arms 194 are in their lowermost position so that the ends of the cracking fingers 183, 184 are positioned above and outside the top edges of the container. As illustrated in the position shown in full lines, the control arm 194 terminates in a platelike portion 235 which is provided with a vertically extending slot 236 adapted to receive the driving shaft 201. The cam follower 226 (Fig. 13) is positioned within the cam guide slot of the associated cam plate 225, the outline of which slot is illustrated by the dotted lines 238 and 239. Thus, as the cam plate 225 rotates in synchronism with shaft 201, the cam follower 226, and, hence, the control arm 194, is raised and subsequently lowered by virtue of rotation of the shaft 201 so that the cracking fingers occupy the successive positions indicated in dotted lines at 242 and 243. During the period when the control arm 194 is raised and lowered, the slide block 195, on which are mounted the cracking fingers and control arms therefor, is moved in the direction of travel of the container through successive positions indicated in dotted lines at 244 and 245.

In order properly to time the action of side folding rollers 185 with respect to the cracking fingers 183, 184, the cam guide slots cooperating with control arms 211 are so shaped as to move the rollers 185 inwardly to engage the side panels of the containers just subsequent to the initial downward movement of the cracking fingers. Thus, the cam plates 212 are provided with a cam guide slot the contour of which is illustrated in Fig. 14 by the dotted lines 250, 251. Thus, as the shaft 201 rotates, with consequent rotation of the cam plates 212, the cam followers 230 associated with the control arms 211 engage the leading edge 252, or step, of the slot 250—251 so as to move the side rollers inwardly by a sufficient amount to contact the side panels of the container.

To provide for pivoting of the side rollers 185 about the pivot point 205 (Fig. 13) the control arms 217 are guided by their respective cam followers which follow a cam guide slot the outlines of which are indicated in Fig. 14 by the dotted lines 255 and 256. It will be noted that the cam slot 255—256 is also provided with the initial step 252 so that the rollers are maintained in a substantially vertical position until contact is made with the upstanding side panels of the container. However, when such contact is made, the control arms 217 continue upward vertical movement in the slot 255—256 to a point where the side panels have been folded to a substantially horizontal position.

After the side panels have been folded to a substantially horizontal position, the side folding rollers are moved outwardly and returned to a vertical position to provide clearance for the next succeeding container.

To control the movement of the slide block 195 so that the cracking fingers associated therewith follow the forward movement of the container, the cam plate 223 is provided with a cam guide slot the outlines of which are indicated by the dotted lines 257 and 258. It will be noted that the cam guide slot 257—258 extends in a gradual, eccentric curve for substantially half of the circumference of the cam plate, thus making a complete sequence of forward and backward movements of the slide bar for one-half revolution of the drive shaft 201, although the cracking fingers move inwardly and return to their initial position during one quarter revolution of the shaft 201.

To correlate the relative positions of the cam followers at a particular point in the cracking cycle, there is shown in Fig. 14 the positions of the followers when the cracking fingers are in the closed position 242. Thus, the followers 226 are positioned at 241, the follower 224 at 240 and the followers 230 and 231 at 237.

In this connection, it will be understood that the control arms 211, 217, 222 and 194, extend through the supporting table of the conveyor apparatus and are journaled in the table 60 so as to prevent sidewise movement of the control arms under the influence of sidewise pressure exerted thereon by the cam followers during engagement with the cam guide slots. By such an arrangement, rotation of the drive shaft 201 is translated into vertical movement of the control arms in the particular desired sequence discussed above.

The side folders 185 are preferably constructed as illustrated in Fig. 15 wherein the rollers 185 are journaled in the top and bottom members 260, 261 of the roller supporting frame 186, the rollers 185 preferably being mounted in anti-friction bearings so as to roll freely along the surface of the containers. The frame 186 is provided with pivot pins 262 and 263 at each end thereof which engage respectively the free ends of control arms 215 and 206.

In Figs. 16 to 18 there is illustrated in the order named the sequence of movement of the side folding rollers 185 under control of the above-described cam operated control arms. Thus, in Fig. 16 the container 10 is illustrated in its initial position within the side folding mechanism. It will be noted that the end portion 264 of control arm 206 extends somewhat beyond the inner surface of the rollers 185, and it is therefore necessary to space the rollers apart by a sufficient amount to allow clearance for the moving containers between the projecting portions 264.

When the container is moved to a point within the end portions 264, the rollers are moved inwardly while maintained in a substantially vertical position so as to assume the position illustrated in Fig. 17. Immediately following the engagement of the rollers with the side panels of the container, the control arms 215 are moved inwardly under the above-described cam controlled action of control arms 217 so that the rollers pivot on the pivot pins 263 to assume the position illustrated in Fig. 18. With the rollers in a substantially horizontal position, it is evident that the end panels are fully collapsed along the score lines thereof and the top portions 265, 266 of the end panels (illustrated in Fig. 17) are pressed tightly together to form, together with the top portions of the side panels of the container, an upstanding closure rib indicated generally at 267. The container closure is thus preformed to substantially the final configuration thereof by substantially simultaneously collapsing the end panels of the container and folding the side panels thereof inwardly and downwardly. After the side panels have been folded to the substantially horizontal position illustrated in Fig. 18, the rollers are moved outwardly and upwardly away from the closure rib 267 by an amount sufficient to allow clearance of the end portions 264 to permit entrance of the next succeeding container.

After the container closure rib has been substantially formed by means of the above-described cracking and forming operations, the side panels of the containers engage a first plow member indicated generally at 270 (Fig. 12). The plow member 270 is adapted to engage the folded side panels of the preformed container and to further fold, or plow down, the side panels so as to increase the sharpness of the side folds and to form a substantially flat top container. Plow member 270 is illustrated in more detail in the sectional view of Fig. 19 wherein it is seen that the plow 270 comprises a pair of substantially flat bars 271, 272 which are twisted gradually from the position indicated in dotted lines to the cross hatched position shown in Fig. 19. The side panels of the container are thus fully depressed by the action of the plow 270 so as to provide a sharp bend along the score lines of the intersection of the side panels with the side walls of the containers.

Still referring to Fig. 19, in order to prepare the upstanding closure rib 267 for final sealing thereof, it is necessary to fold the closure flap portion 273 over the multiple thickness portion of the closure rib. To accomplish this, there is provided at a point immediately following the plow mechanism 270 a first closure flap plow, indicated generally at 275 in Fig. 12. The first closure flap plow is indicated in more detail in Fig. 20 wherein it is seen that the plow 275 comprises a pair of opposed guide bars 276, 277 which are positioned over the guide bars 271, 272 of the plow mechanism 270, the top surfaces of the guide bars 276, 277 forming a bearing surface at the height of the multi-section portion of the closure rib 267 against which the closure flap 273 may be pressed by means of plow member 278. The plow member 278 is arranged with a gradually curved surface 279 which engages the closure flap 273 and folds the flap from a vertical to a substantially horizontal position.

The closure flap is then held in a substantially horizontal position until it engages a second closure flap plow indicated generally at 280 in Fig. 21. The plow mechanism 280 operates to fold the closure flap from a horizontal to a substantially vertical position wherein the closure flap overlies the multi-sectioned portion of the closure rib.

The second closure flap plow mechanism 280 is illustrated in more detail in Fig. 23. Thus, referring to Fig. 23 the plow 280 is illustrated as comprising a solid bar member 281 which is provided with a vertically extending centrally located slot 282 which is adapted to receive the closure rib 267. The closure flap 273, which has been folded to a substantially horizontal position by the plow mechanism 275 engages a gradually curved surface 283 of the member 281 so as to fold closure flap 273 to a substantially vertical position wherein the closure flap 273 overlies the remaining portions of the closure rib. It is to be noted that the plow mechanism 280 maintains the end closure of the container in substantially fully depressed condition by applying pressure solely to the top of the closure rib. With this arrangement, the closure flap is made to conform more closely to the multi-sectioned portion of the closure rib, thus preventing the formation of an air pocket between the closure flap and the multi-sectioned portion of the closure rib. Such an air pocket is commonly formed when the end closure is maintained in a fully depressed condition by pressure upon the side panel as has been discussed in connection with Figs. 1 (a) and 1 (b).

After the closure flap 273 has been formed over the remainder of the closure rib, the fully formed closure rib is then passed through a sealing preheat chamber indicated generally at 71 and discussed generally in connection with Fig. 2. The chamber 71 is defined in part by insulated top walls 285 which are secured to the bottom surface of a pair of bearing support members, one of which is illustrated at 296. The bearing support member 286 is provided with bearing sleeves 287 which receive the shafts 288 of a series of rollers indicated generally at 289. The width of rollers 289 is made substantially equal to the height of the fully formed closure rib, certain ones of the rollers 289 being provided with flanged portions 290 which project over the top of the closure rib and hold down the closure rib during travel thereof through the series of rollers.

In order to provide for containers made from paperboard of various thicknesses wherein the thickness of the fully formed closure rib will vary quite appreciably, the bearing support members 286 are arranged in spaced parallel position, and there is provided means for adjusting the spacing between the bearing support members and hence the spacing between the opposed rollers 289. Thus, the side posts 295 which carry the preheating assembly are mounted on transverse tracks 292 so that the posts may be moved laterally to adjust the spacing between the rollers 289. The posts are secured in adjusted position on the rails 292 by means of the bolts 293. Preferably, the posts 295 are loosely mounted on rails 292 so as to permit the separation between rollers at the exit end of the preheat chamber to be less than the separation at the entrance thereof. With this arrangement the rollers are constantly in contact with the sides of the closure rib as the paraffin coatings of the individual members are softened and the rib is compacted to approximately the thickness of the component paperboard members. The bearing support members 286 are registered by means of locating pins 291 which are adapted to cooperate with corresponding recesses in the opposed bearing support members.

Figure 24:
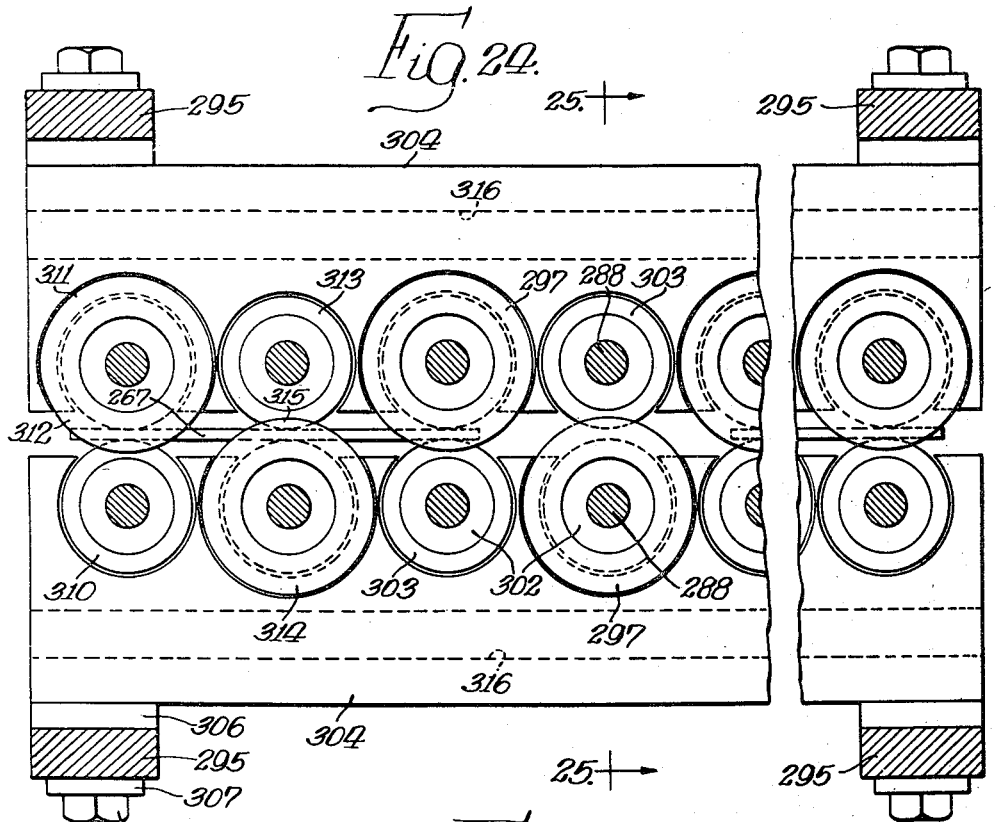
Fig. 24 is a plan view partly in section of a further portion of the apparatus of Fig. 21.
Figure 25:
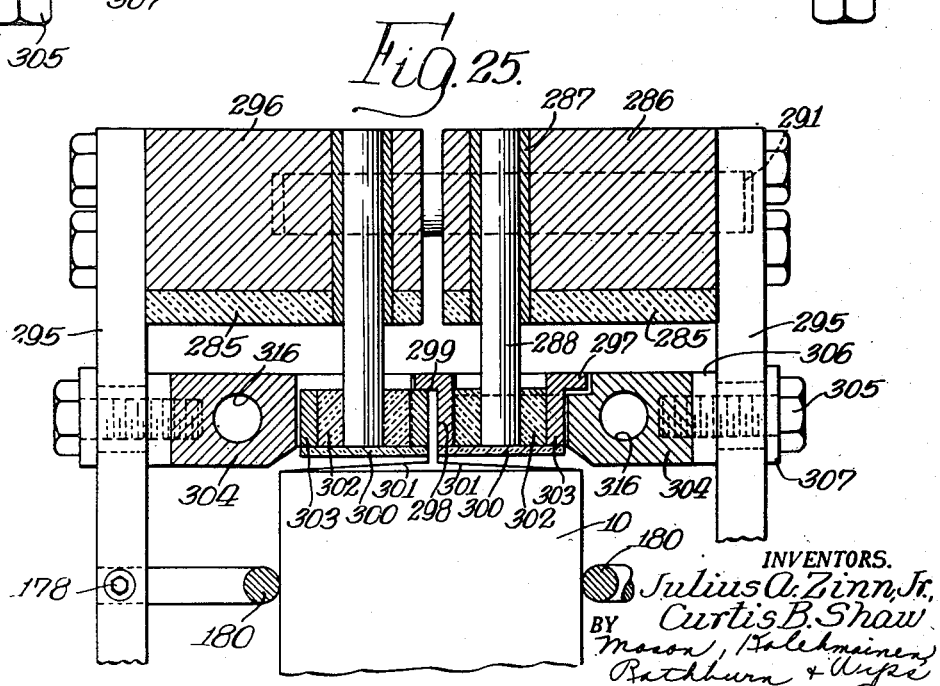
Fig. 25 is a sectional end view of the apparatus of Fig. 23 taken along the lines 25—25 thereof.

In order to preheat the sides of the closure rib without removing the paraffin coating from the side panels of the containers by scorching, or the like, and without exerting pressure upon the side panels so as to open up the closure flap and thus form an air pocket thereunder, the preheating rollers are preferably constructed in a manner illustrated in more detail in Figs. 24 and 25. Thus, referring to these figures, there is provided a series of spaced supporting posts 295 which support the bearing support members 286 and 296. As illustrated in Fig. 25, the insulated top walls 285, which are positioned on the bottom surface of bearing supporting members 286, 296, serve to contain the heat supplied to the rollers and to maintain the area surrounding the rollers at a substantially uniform temperature. The rollers 289 are arranged in opposed pairs, one roller of each pair being provided with a flanged portion 297 which projects beyond the rib-engaging surface 298 of the roller and the lower surface of which engages the top edge of the closure rib as indicated at 299. Thus, the bellows type end closure of the container is maintained in a substantially fully depressed condition by engagement of the top of the closure rib with the under side of the flanged portion 297 of one of the rollers. On the bottom surface of each roller there is provided a disk 300 of insulating material which confines the heat produced by the rollers to the sides of the closure rib and prevents transmission of heat to the side panels 301 of the container. Each roller is preferably constructed with a sleeve 302 of insulating material which shields the shaft 288 of the roller and insulates the same from the conductive outer wall 303 thereof.

While any suitable means may be employed to heat the rollers, it is preferred to heat the rollers by means of heat conductive members 304 which are shaped to conform to the periphery of the rollers. The heat conductive members are provided with apertures 316 extending longitudinally therethrough which apertures are adapted to receive any suitable source of heat, or heating medium. For example, a tubular electric heater may be positioned within the apertures 216. Alternatively, a heated fluid may be circulated therethrough. The members 304 are arranged to transmit heat to the outer surface of the rollers, and through the rollers to the side walls of the closure rib. In this connection it will be understood that the preheating rollers are not driven but instead are rotated by engagement with closure ribs of successive containers passing through the apparatus. The members 304 are supported from the side members 295 by means of bolts 305. In order to reduce to a minimum the heat loss to the supporting members 295, there is provided an insulating washer 306 and insulated bushing 307 which surround the bolt 305 and insulate the heat conductive members 304 from the side members 205. The temperature of the preheating zone 71 is preferably controlled by suitable thermostatic means which control energization of the heaters positioned within the apertures 316.

The preheating rollers are arranged in opposed pairs, alternate ones of each pair of rollers being provided with an overlying flange portion which engages the top of the closure rib. Thus, referring to Fig. 24 wherein the opposed bearing support members 286 and 296 are omitted, the first pair of rollers comprises roller 310 and roller 311, the roller 311 being provided with a flanged portion 312 which extends over and engages the top of the closure rib 267. The next pair of opposed rollers comprises roller 313, which is of small diameter and roller 314 which is provided with an overlying flanged portion 315 which engages the top of the closure rib. It is thus evident that alternate ones of opposed pairs of the rollers engage the top of the closure rib from both sides so as to maintain the end closure fully depressed throughout the travel of the container through the sealing preheat zone. Fig. 24 also illustrates the arrangement of heat conductive members 304, the inner contours of which are adapted closely to conform to the periphery of the rollers.

After the containers have passed through the sealing preheat zone wherein the closure rib is brought to a temperature sufficient to melt the paraffin coating on the side walls thereof and to soften the hot melt adhesive, the container then passes through a pair of heated pressure sealing rollers indicated generally at 320 in Fig. 21. The pressure sealing rollers are provided with an insulating disk 321 positioned on the bottom surface thereof to prevent scorching of the side panels of the container. To restrain the closure rib from upward movement during the sealing operation one of the sealing rollers is provided with an outwardly extending flange portion, similar to the overlying flange portions of the preheating rollers and the other sealing roller is provided with a cooperating groove 345 which receives the flange of the first roller so as to provide a barrier at the height of the closure rib. Also in order further to prevent leakage through the sealed closure rib, the sealing rollers are preferably provided with means for producing a series of horizontal crimp lines along the closure rib so as substantially to prevent leakage upwardly through the closure rib. Thus, one of the sealing rollers is provided with a series of grooves, preferably three in number, which are spaced below the groove 345 and cooperate with a corresponding series of ridges on the other sealing roller to produce a series of longitudinal deformation, or crimp lines in the surface of the closure rib. With this arrangement, leakage through the closure rib, which is necessarily upwardly through the body of the rib and downwardly under the closure flap 18, is substantially prevented by blocking off the wick-like leakage paths by the series of longitudinal crimp lines. The pressure rollers 320 are driven by means of a gear 322 which engages a bevel gear 323, the gear 322 being driven from the sprocket of the conveyor apparatus in the manner illustrated in Fig. 2. The bevel gear 323 is connected through shaft 324 to a driving gear 325 which meshes with and drives the roller gears 326. Gears 326 are in turn connected through hollow shafts 327 to the pressure rollers through insulating disks 328 which substantially prevent loss of heat through the shafts to the associated bearings.

While any suitable means may be used to heat the pressure rollers, we prefer to employ an electrical resistance unit, power for which may be supplied through the slip rings 329, the slip rings being connected through the hollow portion 330 of the shafts connected with each pressure wheel so as to communicate with a chamber 331 in each pressure wheel adapted to receive an electrical heating unit of the proper configuration. Preferably the electrical heating unit is thermostatically controlled so as to maintain the sealing rollers at the correct temperature.

Adjustment of the spacing of the pressure rollers may conveniently be provided in the manner illustrated in Fig. 22. Thus, referring to this figure, the pressure roller indicated generally at 332 is supported by a sleeve member 333 which is pivoted on shaft 334, the opposite end of sleeve 333 being controlled by a thumb screw 335. The thumb screw is preferably spring biased by means of coil spring 336 so as to maintain the proper compression between the pressure rollers while allowing separation thereof in the event that a container of particularly wide dimensions is passed through the rollers.

After the closure rib is sealed by means of the pressure sealing rollers 320, the filled and sealed container is passed through a series of opposed pairs of cooling rollers 337 (Fig. 21). The cooling rollers are of substantially the same configuration as the preheating rollers discussed in connection with the preheat zone 71. However, the conductive members which surround the periphery of the rollers are provided with a suitable cooling medium which is circulated through the members. With this arrangement, the closure rib is quickly cooled so that the hot melt adhesive sets and a uniform, liquid-tight seal is obtained.

In order that the filled containers may readily be discharged from the container baskets of the conveyor mechanism, there is provided the apparatus illustrated in detail in Fig. 26. As shown, the containers are discharged from the container baskets onto a stationary platform comprising a pair of side rails, one of which is illustrated at 340. The side rails are provided with an inwardly extending flange portion which is adapted to support the edges of the containers as they are guided therealong by means of the guide rails 180 and 181. As has been mentioned heretofore, the container basket end members 117 and 118 are narrower than the width of the containers so as to pass between the side rails 340 as is clearly shown in Fig. 26. In order to open the container gate quickly, the cam guide rails 123 and 124 are provided with initial portions 346 and 347 which extend away from the tooth center line 348 of the sprocket wheel on which the conveyor chain is supported so as to cause the forward container gate 118 to be opened rapidly as the container moves forward. Clearance is thus provided between the front edge of the container and the container gate 118. In this connection, it will be recalled that the position of the container gate 118 is controlled by the space between the roller 122 and the tooth center line 348 of the sprocket wheel so that the provision of the initially offset portion 346 and 347 of the cam guide rails provides the above-described discharging action. It will be understood that after the container basket has cleared the solid line 77 of containers the container baskets may remain in their open position and hence the spacing between the tooth center line 348 and the cam guide rails 123 and 124 remains constant thereafter.

In order that the end members 117 of the container baskets may push the containers forward without scratching or scoring the end walls thereof, the upper edges of the end members 117 are preferably rounded slightly so as to present a smooth surface for engagement with the end walls of the containers. With this arrangement, filled containers are moved by the conveyor apparatus onto the stationary rails 340, the rear end members 117 of the container baskets pushing the filled containers along the stationary platform in a manner illustrated in Fig. 26. There is thus provided a solid line 77 of filled containers which are pushed away from this conveyor apparatus by the addition of successive containers to the line. The solid line of containers is pushed onto a freely rotatable turntable from which they may be distributed in a desired manner, as has been discussed in connection with Fig. 2.

In Figs. 27 to 34, inclusive, of the drawings there is shown an alternative embodiment of the invention wherein modified closure rib forming, heat sealing and cooling apparatus are employed. Referring to these figures, it is assumed that the containers are filled, preheated and the bellows type end closure fully depressed by means of the apparatus shown and described above in detail in connection with stations A, B and C of the arrangement shown in Figs. 1(a) and 1(b) so that the containers 10 presented to the apparatus shown in Fig. 27 have the end closure thereof substantially fully depressed with an upstanding closure rib 32 and closure flap 18 therefore, as shown in Fig. 29 of the drawings. After the closure rib 32 and closure flap 18 have been formed the containers are moved between a pair of opposed guide members 360 and 361 positioned along the path of the conveyor, the bottom edges of the guide members 360 and 361 engaging the side walls 14 of the end closure of the container 10 so as to maintain the end closure substantially fully depressed during the closure flap forming operation.

In order to fold the closure flap 18 over the closure rib 32 without producing buckling or deforming of the side walls of the container, there is provided a first folding member 362 which is positioned along the path of movement of the containers and is adapted to move transversely of said path in timed relation to movement of the containers along the path so as to fold the closure flap 18 to a substantially horizontal position. The folding member 362 is attached to the arms 363 and 364 which are pivotally mounted on a bracket 365 which is supported on the member 366 which latter member supports the guide member 360. The outer ends of the arms 363 and 364 are moved up and down in timed relationship to movement of the containers by means of the push rod 367 which is connected by a suitable gearing arrangement (not shown) to the conveyor drive mechanism. Accordingly, when a container has been moved to a position adjacent the folding member 362, the push rod 367 is moved upwardly so that the folding member 362 moves from the position shown in Fig. 29 to the position shown in Fig. 30, in which latter position the folding member 362 engages the closure flap 18 and folds it to a horizontal position, the upper surface of the guide member 361 acting as a shoe portion against which the closure flap 18 is held. As soon as the flap 18 is folded to the horizontal position shown in Fig. 30, the folding member 362 is retracted to its rest position, i. e., the position shown in Fig. 29 so that the folding of the closure flap to a horizontal position is accomplished substantially instantaneously and while the container has been moved only a very short distance by the conveyor mechanism. As a result the drag produced on the end closure of the container during the closure flap forming operation does not produce buckling or deforming of the side walls of the container body since this drag lasts for a very short interval of time during which time the conveyor apparatus tends to move the body portion of the container ahead by only a short distance.

After the closure flap has been folded to the horizontal position shown in Fig. 30, it is then moved to the next flap folding position shown in Fig. 31 in which position the closure flap 18 is folded down around the closure rib 32 to provide a fully formed closure rib, for the reasons described in detail above in connection with the embodiment shown in Figs. 1(a) and 1(b). More particularly, there is provided immediately adjacent the folding member 362 a second folding member 370 which extends over the center line of the path of the containers and is provided with a downturned flange portion 371. The guide member 361 is provided with a recessed portion 372 which defines an upstanding flange portion 373 immediately adjacent the closure rib 32 of the container 10. The folding member 370 is supported on a vertically extending post 375 which is moved up and down in timed relationship to movement of the containers by the conveyor apparatus so as to fold the closure flap 18 over the closure rib 32. Thus, after the container has been moved to a position in which the closure flap 18 is entirely beneath the downturned flange portion 371, the post 375 is moved downwardly so that the closure flap 18 is folded around the upturned flange portion 373 of the guide member 361, i. e., the position shown in Fig. 32. After the closure flap 18 has been folded over the flange portion 373 the folding member 370 is moved upwardly to its rest position, i. e., the position shown in Fig. 31, and the downward and upward movement of the member 370 is substantially instantaneous so that buckling and deforming of the side walls of the container are prevented. In this connection it will be understood that the post 375 is connected by a suitable gearing arrangement (not shown) to the conveyor drive mechanism so as to move the member 370 downward to perform the closure flap forming operation when the container has been moved to the desired position beneath the flange 371. It will also be noted that the flange 371 is positioned immediately adjacent the end of the folding member 362 so that the closure flap 18 rides beneath the edge of the flange 371 immediately after the folding member 362 is returned to its rest position. Accordingly, the closure flap 18 is restrained in a substantially horizontal position while it is moved to the desired position in which the entire length of the closure flap 18 is positioned beneath the flange 371. After the closure rib has been fully formed the container is moved so that the closure flap 18 moves beyond the end of the flange 373 and engages a curved outer flange 376 of the guide member 361 with the result that the closure flap 18 is pressed firmly against the closure rib 32 in preparation for the heat sealing operation.

In order to perform the heat sealing operation on the closure rib of the container without producing buckling or deforming of the side walls of the container, there is provided means for gripping the closure rib of the container and moving the container at a speed just slightly greater than the speed of the conveyor so that the container actually moves forwardly relative to the rear container gate 118 which pushes the container through the various folding and forming apparatus. More particularly, there is provided a pair of spaced guide members 380 and 381 which are positioned along the path of movement of the containers and adjacent to the fully formed closure rib thereof, as is best illustrated in Fig. 33. The opposed faces of the guide members 380 and 381 are provided with longitudinally extending grooves 382 and 383 and the guide members 380 and 381 are supported by means of a plurality of transverse rods 384 and 385 which are supported from the base of the apparatus by means of the posts 386 and 387, the guide member 380 being resiliently urged toward guide member 381 by means of the coil springs 388 positioned around the rods 384.

In order to supply sealing heat and pressure to the side walls of the closure rib of the container there is provided a pair of endless link chains 390 and 391 which travel within the grooves 382 and 383 in the opposed faces of the guide members 380 and 381, as is best illustrated in Fig. 33. The portions of the chains 390 and 391 which are exterior of the guide members 380 and 381 are supported by means of the main sprockets 392 and the auxiliary sprockets 393. The chains 390 and 391 are driven in synchronism by a suitable power source (not shown) so that the link chains 390 and 391 move through the guide members 380 and 381 at a fixed rate of speed. As a result, the opposed edges of the link chains 390 and 391 grip the side walls of the fully formed closure rib of the container as the container is moved forwardly by the conveyor mechanism. However, in accordance with an important feature of the present invention the link chains 390 and 391 are driven at a speed just slightly greater than the speed of the conveyor mechanism so that as soon as the link chains grip the closure rib the container is moved forwardly relative to the rear container gate 118 of the conveyor mechanism. With this arrangement, the container is not forced through the heat sealing apparatus by engagement of the rear container gate 118 with the side wall of the container but instead the container is moved through the heat sealing apparatus by engagement of the link chains 390 and 391 with the closure rib of the container. Accordingly, during travel through the heat sealing position the container is at all times out of engagement with the rear container gate 118. However, it will be understood that the container is not moved forwardly by an amount sufficient to move the container off of the plateform 116. In this connection, it will be understood that the rear container gate 118 of the conveyor mechanism shown in Figs. 27 to 35, inclusive, corresponds to the rear container gate 117 of the conveyor mechanism shown in Figs. 5 and 26 of the drawings. In other respects the conveyor mechanism of the two embodiments are substantially identical except for the fact that the front container gate 118 of the embodiment shown in Figs. 5 and 26 is eliminated in the embodiment of Figs. 27 to 35, inclusive, to permit the contanier to be moved forwardly relative to the conveyor in the manner described immediately above. After the heat sealing operation the containers are again moved forwardly by engagement of the rear container gate 118 with the container.

The guide members 380 and 381 are heated by any suitable means and in the illustrated embodiment the guide members 380 and 381 are provided with the transversely extending openings 395 and 396 which are adapted to receive suitable electrical resistance heating units the electrical conductors 396 of which are adapted to be connected to any suitable energizing circuit as will be readily understood by those skilled in the art. A pair of thermostatic elements 397 may be positioned on the guide members 380 and 381 and connected in a suitable control circuit so as to control the supply of electrical energy to the resistance heating units and hold the temperature of the guide members 380 and 381 at the desired value, as will be readily understood by those skilled in the art. In this connection it will be understood that any other suitable heating medium, such as heated fluid or the like, may be employed to maintain the guide members 380 and 381 at the desired temperature. In the alternative, the chains 390 and 391 may be heated directly by means of a suitable heat source located exteriorly of the guide members 380 and 381.

In order to maintain the end closure of the container 10 substantially fully depressed during the heat sealing operation without scorching the side walls of the end closure or causing the closure flap to open up, the guide member 381 is provided with an overhanging flange portion 400 which extends over the top of the fully formed closure rib of the container and maintans the end closure fully depressed by applying pressure to the top of the closure rib. In this connection it will be understood that the bottom edges 401 and 402 of the guide members 380 and 381 are preferably spaced somewhat above the side walls of the end closure, as is best illustrated in Fig. 33, so as to prevent scorching of these side walls during travel of the container through the heat sealing apparatus. It will also be understood that the link chains 390 and 391 are in intimate heat transmitting contact with the heated surfaces of the guide members 380 and 381 so that the link chains supply heat directly to the side walls of the fully formed closure rib to effect the container sealing operation. After the rib has been heat sealed, the container is moved beyond the chains 390 and 391 by engagement of the rear container gate 18 with the rear wall of the container, the spaced hold down wheels 415 being employed to maintain the end closure of the container fully depressed. The wheels 415 are provided with grooves 416 which are adapted to receive the closure rib of the container but are freely rotatable so as to produce a minimum drag on the top portion of the container. The container is then passed to a cooling station in which the link chains 417 and 418 grip the closure rib of the container and move the container at a slightly greater speed than the conveyor mechanism so that buckling of the container is prevented as described above in connection with the heat sealing station. However, it will be understood that the chains 417 and 418 are cooled by a suitable medium which is either circulated through the chain guide members or applied directly to the link elements of the chain external to the guide members.

Preferably, the link 390 and 391 are of the so-called silent type in which the individual link elements are positioned in staggered relationship on the connecting pins of the chain and are provided with relatively long, flat sides so that the link elements of the chain are substantially equivalent to a series of parallel bars which grip the side walls of the closure rib. Thus, as shown in Fig. 34, the individual links 405 of the silent chain are positioned in staggered relation on the link connecting pins 406 of the chain. Preferably the pins 406 are spaced relatively close together in the order of three sixteenths of an inch apart to approximate a series of parallel sealing bars and to provide a strong, durable seal of the closure rib. Also, due to the staggered relationship of the link elements 405 no direct leakage paths are provided by which liquid can work up through the sealed closure rib. In this connection it will be understood that the individual link elements of the chain 390 are positioned directly opposite the corresponding link elements of the chain 391 so that sealing heat and pressure is applied in the contact areas of the link elements without crimping or deforming the side walls of the closure rib.

The closure rib of the container may also be sealed and cooled by means of the alternative chain arrangement shown in Figs. 35 and 36 wherein alternate links 410 of a conventional roller chain are provided with right angle brackets 411 to which are secured flat plates 412 which are adapted to clamp the side walls of the closure rib and apply sealing heat and pressure thereto. The plates 412 are adapted to travel in suitable grooves in the guide members 380 and 381 and may be heated or cooled by contact with the members 380 and 381 or heated or cooled directly by any suitable arrangement external to the guide members 380 and 381.

While the closing and sealing apparatus of the present invention has been illustrated in connection with containers of a particular height, it will be understood that containers of different heights may readily be accommodated by suitable raising or lowering of the conveyor chain and the provision of container baskets of appropriate dimensions.

While there have been described what are at present considered to be the preferred embodiments of the invention, it will be understood that various modifications may be made therein which are within the true spirit and scope of the invention as defined in the appended claims.

What is claimed as new and is desired to be secured by Letters Patent of the United States is:

1. Apparatus for closing and sealing paraffined or similarly treated paperboard containers of the type having a preformed body portion surmounted by an open mouthed portion scored along predetermined fold lines and adapted to form a fully depressible bellows type end closure, comprising means for folding said mouth portion to form a fully depressed end closure having a fully formed closure rib, conveyor means for moving the containers along a predetermined path, and means for applying sealing heat and pressure to the side walls of said closure rib while maintaining said closure fully depressed by applying pressure to the top of said rib, said last named means including a pair of opposed link chains adapted to engage opposite sides of said closure rib, and means for moving said chains along said path in synchronism and at a speed slightly greater than the speed of said conveyor means, whereby said chains grip said closure rib and move the container forwardly relative to said conveyor means to prevent buckling of the side walls of the container.

2. Apparatus for closing and sealing paraffined or similarly treated paperboard containers of the type having a preformed body portion surmounted by an open mouthed portion scored along predetermined fold lines and adapted to form a fully depressible bellows type end closure, comprising means for folding said mouth portion to form a fully depressed end closure having a fully formed closure rib, a container supporting platform supported for movement along a predetermined path and having a rear container gate upstanding therefrom, a pair of opposed link chains positioned along said path, means resiliently urging the opposed portions of said chains together to clamp the closure rib of a container supported on said platform therebetween, and means for moving said chains along said path in synchronism and at a speed slightly greater than the speed of said platform, whereby said container is moved forwardly relative to said rear container gate to prevent said gate from deforming the side walls of said container.

3. Apparatus for closing and sealing paraffined or similarly treated paperboard containers of the type having a preformed body portion surmounted by an open mouthed portion scored along predetermined fold lines and adapted to form a fully depressible bellows type end closure, comprising means for folding said mouth portion to form a fully depressed end closure having a fully formed closure rib, a container supporting platform supported for movement along a predetermined path and having a rear container gate upstanding therefrom, a pair of spaced guide members positioned along said path and having grooves in the opposed faces thereof, means resiliently urging said guide members together, a pair of link chains adapted to travel in said grooves and clamp the fully formed closure rib of a container supported on said platform therebetween, one of said guide members having a top flange portion overhanging the center line of said path to maintain said closure rib fully depressed by engagement with the top thereof, and means for moving said chains along said path in synchronism and at a speed slightly greater than the speed of said platform, whereby said container is moved forwardly relative to said rear container gate during travel along said path to prevent said gate from deforming the side walls of said container.

4. Apparatus for closing and sealing paraffined or similarly treated paperboard containers of the type having a preformed body portion surmounted by an open mouthed portion scored along predetermined fold lines and adapted to form a fully depressible bellows type end closure comprising means for folding said mouth portion to form a fully depressed end closure having a fully formed closure rib, a container supporting platform supported for movement along a predetermined path and having a rear container gate upstanding therefrom, a pair of spaced guide members positioned along said path and having grooves in the opposed faces thereof, means resiliently urging said guide members together, means for heating said guide members, a pair of link chains positioned in said grooves in heat receiving relation to said guide members and adapted to clamp the fully formed closure rib of a container supported on said platform therebetween, one of said guide members having a top flange portion overhanging the center line of said path to maintain said closure rib fully depressed by engagement with the top thereof, and means for moving said chains along said path in synchronism and at a speed slightly greater than the speed of said platform, whereby said container is moved forwardly relative to said rear container gate during travel along said path to prevent said gate from deforming the side walls of said container.

5. Apparatus for closing and sealing paraffined or similarly treated paperboard containers of the type having a preformed body portion surmounted by an open mouthed portion scored along predetermined fold lines and adapted to form a fully depressible bellows type end closure, comprising means for moving the containers along a predetermined path, means positioned along said path for folding the mouth portion of a container moved along said path to form a substantially fully depressed end closure having an upstanding closure rib and closure flap therefor, means for folding said closure flap over said closure rib to provide a fully formed closure rib, said last named means including guide means adapted to maintain said end closure substantially fully depressed and having a shoe portion adjacent said path followed up an upstanding flange portion adjacent said path, a first member positioned adjacent said shoe portion and adapted to move transversely of said path in timed relation to movement of the container along said path, thereby to fold said closure flap to a horizontal position on said shoe portion, and a second member positioned adjacent said flange portion and including a downwardly extending flange portion adapted to cooperate with said upstanding flange portion to fold said closure flap over said upstanding flange portion upon downward movement of said member in timed relation to movement of the container along said path, and means for applying sealing heat and pressure to the side walls of said closure rib after said closure flap is folded thereover while maintaining said closure fully depressed by applying pressure to the top of said rib.

References Cited in the file of this patent

UNITED STATES PATENTS

| | | |
|---|---|---|
| 733,460 | Cormack | July 14, 1903 |
| 1,224,475 | Logan | May 1, 1917 |
| 1,649,304 | Gray | Nov. 15, 1927 |
| 1,854,075 | Smith | Apr. 12, 1932 |
| 1,986,043 | Carter | Jan. 1, 1935 |
| 2,030,067 | Litchfield | Feb. 11, 1936 |
| 2,156,037 | Wollenweber | Apr. 25, 1939 |
| 2,175,557 | Cundall | Oct. 10, 1939 |
| 2,384,179 | Knies | Sept. 4, 1945 |
| 2,530,412 | Wallace | Nov. 21, 1950 |
| 2,575,544 | Zinn | Nov. 20, 1951 |
| 2,606,850 | Piazze | Aug. 12, 1952 |